United States Patent [19]

Yamashita et al.

[11] Patent Number: 5,622,047
[45] Date of Patent: Apr. 22, 1997

[54] METHOD AND APPARATUS FOR DETECTING SATURATION GAS AMOUNT ABSORBED BY CATALYTIC CONVERTER

[75] Inventors: Yukihiro Yamashita, Kariya, Japan; Kenji Ikuta, Rolling Hills Estates, Calif.; Shigenori Isomura, Kariya, Japan

[73] Assignee: Nippondenso Co., Ltd., Kariya, Japan

[21] Appl. No.: 318,599

[22] Filed: Oct. 5, 1994

Related U.S. Application Data

[63] Continuation-in-part of Ser. No. 84,730, Jul. 1, 1993, abandoned.

[30] Foreign Application Priority Data

Jul. 3, 1992 [JP] Japan .................................. 4-177229
Oct. 12, 1993 [JP] Japan .................................. 5-253890

[51] Int. Cl.[6] ........................................................ F01N 3/20
[52] U.S. Cl. .............................. 60/274; 60/276; 60/277; 60/285
[58] Field of Search .......................... 60/274, 276, 277, 60/285

[56] References Cited

U.S. PATENT DOCUMENTS

| | | |
|---|---|---|
| 4,739,614 | 4/1988 | Katsuno et al. . |
| 5,077,970 | 1/1992 | Hamburg . |
| 5,090,199 | 2/1992 | Ikuta et al. . |
| 5,103,640 | 4/1992 | Nada et al. ................................ 60/277 |
| 5,154,055 | 10/1992 | Nakane et al. . |
| 5,220,788 | 6/1993 | Kurita et al. . |
| 5,363,091 | 11/1994 | Kotwicki ................................... 60/277 |

FOREIGN PATENT DOCUMENTS

| | | |
|---|---|---|
| 0312835 | 4/1989 | European Pat. Off. . |
| 61-286550 | 12/1986 | Japan . |
| 1110853 | 4/1989 | Japan . |
| 2-238147 | 9/1990 | Japan . |
| 3-185244 | 8/1991 | Japan . |
| 3-217633 | 9/1991 | Japan . |
| 2-242544 | 10/1991 | Japan . |
| 3-253714 | 11/1991 | Japan . |

Primary Examiner—Douglas Hart
Attorney, Agent, or Firm—Cushman, Darby & Cushman IP Group of Pillsbury Madison & Sutro LLP

[57] ABSTRACT

In an apparatus for detecting a saturation gas amount absorbed by a catalytic converter disposed in an exhaust system of an engine, an air-to-fuel ratio detecting device is disposed in a region of the engine exhaust system downstream of the catalytic converter for monitoring exhaust gas, which has passed through the catalytic converter, to detect an air-to-fuel ratio of an air-fuel mixture causing the exhaust gas. An air-to-fuel ratio changing device serves to change an air-to-fuel ratio of an air-fuel mixture fed to the engine by a correction quantity in a given direction, and serves to maintain changing the air-to-fuel ratio during a correction time. A change increasing device serves to increase the correction quantity and/or the correction time by the air-to-fuel ratio changing device to execute an air-to-fuel ratio changing process again in cases where the air-to-fuel ratio detected by the air-to-fuel ratio detecting device does not vary even when the air-to-fuel ratio changing device executes changing the air-to-fuel ratio. A saturation gas amount calculating device serves to calculate a saturation gas amount absorbed by the catalytic converter on the basis of the correction quantity and the correction time in cases where the air-to-fuel ratio detected by the air-to-fuel ratio detecting device varies when the air-to-fuel ratio changing device executes changing the air-to-fuel ratio.

16 Claims, 23 Drawing Sheets

METHOD AND APPARATUS FOR DETECTING SATURATION GAS AMOUNT ABSORBED BY CATALYTIC CONVERTER

CROSS-REFERENCES TO RELATED APPLICATIONS

This is a continuation-in-part of U.S. patent application Ser. No. 08/084,730, filed on Jul. 1, 1993 Abandoned.

BACKGROUND OF THE INVENTION

1. Field of the Invention

This invention relates to an apparatus for detecting a saturation gas amount absorbed by a catalytic converter such as an automotive catalytic converter disposed in an engine exhaust system. This invention also relates to a method of detecting a saturation gas amount absorbed by a catalytic converter. This invention further relates to a method and an apparatus for detecting a condition of deterioration of a catalytic converter.

2. Description of the Prior Art

It is well-known to convert harmful components of the exhaust gas of an internal combustion engine, such as HC, $NO_x$, and CO, into nontoxic gases by means of a catalytic converter located in the engine exhaust system. Generally, the characteristics of such an automotive catalytic converter tend to decrease as it ages.

Japanese published unexamined patent application 61-286550 corresponding to U.S. Pat. No. 4,739,614 suggests an apparatus for detecting an unacceptable deterioration of an automotive catalytic converter. In Japanese application 61-28650, attention is paid to the fact that a variation of the oxygen concentration of the exhaust gas at the downstream side of a catalytic converter more clearly reflects a variation of the oxygen concentration of the exhaust gas at the upstream side thereof as the characteristics of the catalytic converter decrease. The apparatus of Japanese application 61-286550 includes an $O_2$ sensor (oxygen sensor or probe) disposed at a position downstream of the catalytic converter. Detection is given of certain conditions where the voltage output of the $O_2$ sensor varies above a reference voltage and the period of this variation is shorter than a reference period. In the apparatus of Japanese application 61-286550, when the number of times of the occurrence of such conditions reaches a reference number, the catalytic converter is determined to be unacceptably deteriorated.

Japanese published unexamined patent application 3-253714 corresponding to U.S. Pat. No. 5,154,055 discloses an apparatus for detecting a purification factor of an automotive catalytic converter. The apparatus of Japanese application 3-253714 includes first and second air-to-fuel ratio sensors ($O_2$ sensors) disposed at positions upstream and downstream of the catalytic converter respectively. Detection is given of delay times of the responses of the $O_2$ sensors to a rich-to-lean change of an air-fuel mixture. In the apparatus of Japanese application 3-253714, the purification factor of the catalytic converter is estimated from the difference between the detected response delay times. The differences between the detected response delay times are detected under two different engine operating conditions to calculate inherent response delay times of the $O_2$ sensors. The inherent response delay times are canceled in the estimation of the purification factor to increase the accuracy of the estimated purification factor.

U.K. patent application GB 2,242,544A discloses that automotive three-way catalytic converters have a gas storage capacity (in particular, an oxygen storage capacity). The degree of conversion by the catalytic converter depends on the oxygen component in the exhaust gas which is influenced by stored oxygen delivered up by the catalytic converter. Thus, in U.K. patent application GB 2,242,544A, the degree of conversion by the catalytic converter is optimized by targeted enrichment or weakening of the ratio of air to fuel.

SUMMARY OF THE INVENTION

It is a first object of this invention to provide a reliable apparatus for detecting a saturation gas amount absorbed by a catalytic converter.

It is a second object of this invention to provide a reliable method of detecting a saturation gas amount absorbed by a catalytic converter.

It is a third object of this invention to provide a reliable apparatus for detecting a condition of deterioration of a catalytic converter.

It is a fourth object of this invention to provide a reliable method of detecting a condition of deterioration of a catalytic converter.

A first aspect of this invention provides an apparatus for detecting a saturation gas mount absorbed by a catalytic converter disposed in an exhaust system of an engine which comprises air-to-fuel ratio detecting means disposed in a region of the engine exhaust system downstream of the catalytic converter for monitoring exhaust gas, which has passed through the catalytic converter, to detect an air-to-fuel ratio of an air-fuel mixture causing the exhaust gas; air-to-fuel ratio changing means for changing an air-to-fuel ratio of an air-fuel mixture fed to the engine by a correction quantity in a given direction, and for maintaining said changing the air-to-fuel ratio during a correction time; change increasing means for increasing the correction quantity and/or the correction time by the air-to-fuel ratio changing means to execute an air-to-fuel ratio changing process again in cases where the air-to-fuel ratio detected by the air-to-fuel ratio detecting means does not vary even when the air-to-fuel ratio changing means executes said changing the air-to-fuel ratio; and saturation gas amount calculating means for calculating a saturation gas amount absorbed by the catalytic converter on the basis of the correction quantity and the correction time in cases where the air-to-fuel ratio detected by the air-to-fuel ratio detecting means varies when the air-to-fuel ratio changing means executes said changing the air-to-fuel ratio.

A second aspect of this invention provides an apparatus for detecting a saturation gas amount absorbed by a catalytic converter disposed in an exhaust system of an engine which comprises means for feeding an air-fuel mixture to the engine; means for changing an air-to-fuel ratio of the air-fuel mixture from a stoichiometric air-to-fuel ratio to saturate the catalytic converter; means for detecting whether or not the catalytic converter is saturated by said changing the air-to-fuel ratio by the changing means; and means for, when the detecting means detects that the catalytic converter is saturated, determining a saturation gas amount absorbed by the catalytic converter in accordance with conditions of said changing the air-to-fuel ratio by the changing means.

A third aspect of this invention provides a method of detecting a saturation gas amount absorbed by a catalytic converter disposed in an exhaust system of an engine which comprises the steps of feeding an air-fuel mixture to the engine; changing an air-to-fuel ratio of the air-fuel mixture from a stoichiometric air-to-fuel ratio to saturate the catalytic converter; detecting whether or not the catalytic converter is saturated by said changing the air-to-fuel ratio; and when the catalytic converter is detected to be saturated, determining a saturation gas amount absorbed by the catalytic converter in accordance with conditions of said changing the air-to-fuel ratio.

A fourth aspect of this invention provides an apparatus for detecting a condition of deterioration of a catalytic converter disposed in an exhaust passage of an internal combustion engine which comprises upstream air-to-fuel ratio detecting means provided in a region of the exhaust passage upstream of the catalytic converter for detecting an air-to-fuel ratio of an air-fuel mixture causing exhaust gas flowing into the catalytic converter; downstream air-to-fuel ratio detecting means provided in a region of the exhaust passage downstream of the catalytic converter for detecting an air-to-fuel ratio of an air-fuel mixture causing exhaust gas flowing from the catalytic converter; air-to-fuel ratio control means for controlling a rate of fuel injection into the engine in response to a result of said detecting by the upstream air-to-fuel ratio detecting means, and for varying the air-to-fuel ratio of the air-fuel mixture causing the exhaust gas flowing into the catalytic converter around a predetermined air-to-fuel ratio at an amplitude and a period: increasing control means for correcting and increasing at least one of the amplitude and the period of said varying by the air-to-fuel ratio control means during a predetermined time; and deterioration condition determining means for increasing a degree of said increasing by said increasing control means in cases where the air-to-fuel ratio detected by the downstream air-to-fuel ratio detecting means does not vary although at least one of the amplitude and the period is corrected and increased by the increasing control means, and for, when the air-to-fuel ratio detected by the downstream air-to-fuel ratio detecting means varies, determining a condition of deterioration of the catalytic converter in response to the amplitude and the period which occur at a present moment.

A fifth aspect of this invention provides a method of detecting a condition of deterioration of a catalytic converter disposed in an exhaust passage of an internal combustion engine which comprises the steps of detecting an upstream air-to-fuel ratio of an air-fuel mixture causing exhaust gas flowing into the catalytic converter; detecting a downstream air-to-fuel ratio of an air-fuel mixture causing exhaust gas flowing from the catalytic converter; controlling a rate of fuel injection into the engine in response to a result of said detected upstream air-to-fuel ratio, and varying the air-to-fuel ratio of the air-fuel mixture causing the exhaust gas flowing into the catalytic converter around a predetermined air-to-fuel ratio at an amplitude and a period; correcting and increasing at least one of the amplitude and the period of said varying of the air-to-fuel ratio; and increasing a degree of said increasing of at least one of the amplitude and the period in cases where the detected downstream air-to-fuel ratio does not vary although at least one of the amplitude and the period is corrected and increased, and when the detected downstream air-to-fuel ratio varies, determining a condition of deterioration of the catalytic converter in response to the amplitude and the period which occur at a present moment.

A sixth aspect of this invention provides an apparatus for detecting a degree of deterioration of a catalytic converter disposed in an exhaust system of an engine which comprises means for feeding an air-fuel mixture to the engine; means for changing an air-to-fuel ratio of the air-fuel mixture from a stoichiometric air-to-fuel ratio to saturate the catalytic converter; means for detecting whether or not the catalytic converter is saturated by said changing the air-to-fuel ratio by the changing means; and means for, when the detecting means detects that the catalytic converter is saturated, determining a degree of deterioration of the catalytic converter in accordance with conditions of said changing the air-to-fuel ratio by the changing means.

A seventh aspect of this invention provides a method of detecting a degree of deterioration of a catalytic converter disposed in an exhaust system of an engine which comprises the steps of feeding an air-fuel mixture to the engine; changing an air-to-fuel ratio of the air-fuel mixture from a stoichiometric air-to-fuel ratio to saturate the catalytic converter; detecting whether or not the catalytic converter is saturated by said changing the air-to-fuel ratio; and when the catalytic converter is detected to be saturated, determining a degree of deterioration of the catalytic converter in accordance with conditions of said changing the air-to-fuel ratio.

DESCRIPTION OF THE PREFERRED EMBODIMENT

First Embodiment

Figure 1:
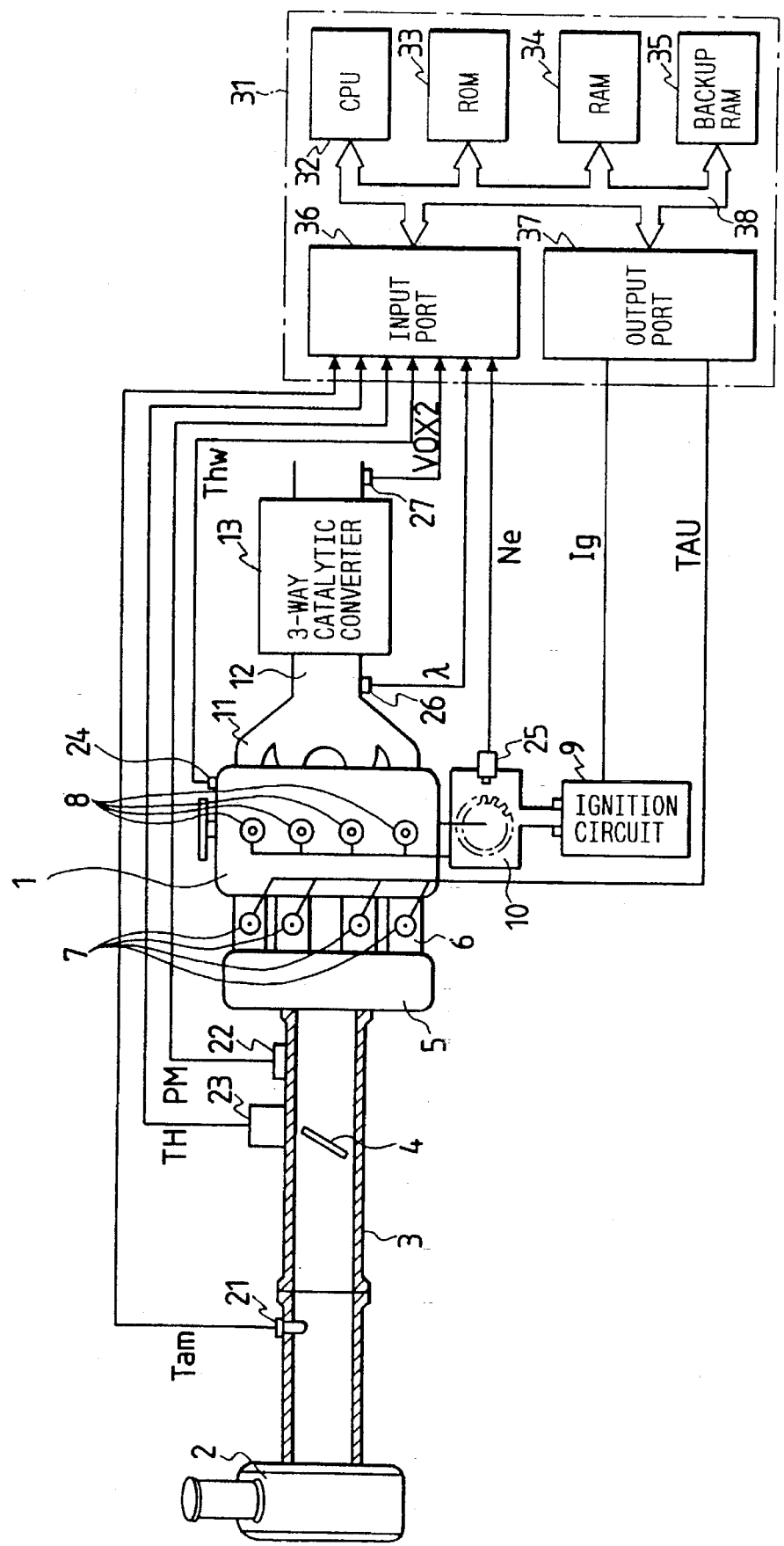
FIG. 1 is a block diagram of an internal combustion engine and an air-to-fuel (A/F) ratio control system incorporating an apparatus according to a first embodiment of this invention.

With reference to FIG. 1, a spark-ignition internal combustion engine 1 has four cylinders or combustion chambers. Fresh air flows through an air cleaner 2, an air induction pipe 3, a throttle valve 4, a surge tank 5, and an intake manifold 6 before being drawn into the cylinders of the engine 1. Fuel injection valves 7 extending into respective branches of the intake manifold 6 serve to inject fuel thereinto. The injected fuel mixes with the fresh air, forming an air-fuel mixture supplied to the engine cylinders.

The engine cylinders are provided with spark plugs 8 respectively. An ignition circuit 9 generates high voltages which are sequentially distributed to the spark plugs 8 via a distributor 10. Sparks occur in the plugs 8 in response to the high voltages, igniting and burning the air-fuel mixture in the engine cylinders. As a result of the burning of the air-fuel mixture, exhaust gas occurs.

The exhaust gas is expelled from the engine cylinders into an exhaust manifold 11, and then flows through the exhaust manifold 11 before reaching an exhaust pipe 12. A three-way catalytic converter 13 is provided in the exhaust pipe 12. The exhaust gas enters the catalytic converter 13 while flowing along the exhaust pipe 12. The device 13 converts harmful components of the exhaust gas, such as HC, NO$_x$, and CO, into nontoxic gases. After the exhaust gas exits from the catalytic converter 13, it is emitted to atmosphere.

A temperature sensor 21 provided in the air induction pipe 3 detects the temperature of air in a region upstream of the throttle valve 4 and outputs a signal representing the detected air temperature Tam. A pressure sensor 22 provided in the air induction pipe 3 detects the pressure of air in a region downstream of the throttle valve 4 and outputs a signal representing the detected air pressure (that is, the intake air pressure) PM. A throttle sensor 23 associated with the throttle valve 4 detects the angular position of the throttle valve 4, that is, the degree of opening of the throttle valve 4, and outputs an analog signal representing the detected throttle opening degree TH. The throttle sensor 23 includes an idle switch which outputs a binary signal representing whether or not the throttle valve 4 is essentially in a fully-closed position.

A temperature sensor 24 provided in a cylinder block of the engine 1 detects the temperature of engine coolant and outputs a signal representing the detected engine coolant temperature Thw. A crank angle sensor or a rotational speed sensor 25 associated with the distributor 10 detects the rotational speed of the crankshaft of the engine, that is, the engine rotational speed, and outputs a signal representing the detected engine speed Ne. Specifically, the engine speed sensor 25 outputs twenty-four pulses per every two revolutions of the engine crankshaft.

An A/F ratio sensor 26 provided in a region of the exhaust pipe 12 upstream of the three-way catalytic converter 13 monitors the exhaust gas and thereby detects the air-to-fuel (A/F) ratio of an air-fuel mixture causing the exhaust gas. The A/F ratio sensor 26 outputs a signal representing the detected A/F ratio λ. An A/F ratio sensor or an O₂ sensor 27 provided in a region of the exhaust pipe 12 downstream of the catalytic converter 13 monitors the oxygen concentration of the exhaust gas and thereby detects the A/F ratio of an air-fuel mixture causing the exhaust gas. The O₂ sensor 27 outputs a voltage signal VOX2 depending on the A/F ratio of the air-fuel mixture causing the exhaust gas. Generally, the output signal of the O₂ sensor 27 is sensitive to whether an air-fuel mixture causing the exhaust gas is rich or lean.

An electronic control unit 31 has a microcomputer or a similar device which includes a CPU 32, a ROM 33, a RAM 34, a backup RAM 35, an input port 36, and an output port 37 connected via a bus 38. The control unit 31 operates in accordance with a program stored in the ROM 33. The input port 36 receives the output signals of the sensors 21–27. The control unit 31 calculates a target fuel injection rate TAU and a target ignition timing (target spark timing) Ig on the basis of the air temperature Tam, the intake air pressure PM, the throttle opening degree TH, the coolant temperature Thw, the engine speed Ne, the A/F ratio λ, and the mixture rich/lean indication VOX2 represented by the output signals of the sensors 21–27. A control signal representing the target fuel injection rate TAU is outputted to the fuel injection valves 7 via the output port 37 so that fuel can be injected via the fuel injection valves 7 at a rate equal to the target fuel injection rate TAU. A control signal representing the target ignition timing Ig is outputted to the ignition circuit 9 via the output port 37 so that ignition can occur at a timing equal to the target ignition timing Ig.

The control unit 31 adjusts the target fuel injection rate TAU to execute control of the A/F ratio λ. The characteristics of the A/F ratio control are previously designed by using a technique described later. The designing technique is similar to that disclosed in Japanese published unexamined patent application 64-110853.

(1) Modeling of Controlled Object

A dynamic model of the system for controlling the A/F ratio λ is determined, through approximation, on the basis of an autoregressive moving average model having an order of 1 and a dead time p=3. In addition, a disturbance is taken into consideration in the approximation for determining the dynamic model of the system. The dynamic model of the A/F ratio controlling system is approximated by using the following equation.

$$\lambda(k)=a\cdot\lambda(k-1)+b\cdot FAF(k-3) \tag{1}$$

where λ denotes an A/F ratio; FAF denotes an A/F ratio corrective coefficient; "a" and "b" denote model constants; and "k" is a variable representing the number of times of sampling which corresponds to the moment of sampling. In view of a disturbance "d", the equation (1) is modified as follows.

$$\lambda(k)=a\cdot\lambda(k-1)+b\cdot FAF(k-3)+d(k-1) \tag{2}$$

It is easy to experimentally determine the model constants "a" and "b" by synchronizing the sapling with the engine crankshaft rotation period (360° in crank angle) and using a step response technique with respect to the dynamic model corresponding to the equation (2), and thereby calculating the transfer function of the system for controlling the A/F ratio λ. The determination of the model constants "a" and "b" results in the determination of the dynamic model of the A/F ratio controlling system.

(2) Method of Representing State Variables X

State variables or a state variable vector X is now defined as follows.

$$X(k)=[X_1(k), X_2(k), X_3(k), X_4(k)]^T \quad (3)$$

where the superscript T denotes the transposed matrix (vector).

When the state variables X are used, the equation (2) is rewritten as follows.

$$\begin{bmatrix} X_1(k+1) \\ X_2(k+1) \\ X_3(k+1) \\ X_4(k+1) \end{bmatrix} = \begin{bmatrix} a & b & 0 & 0 \\ 0 & 0 & 1 & 0 \\ 0 & 0 & 0 & 1 \\ 0 & 0 & 0 & 0 \end{bmatrix} \begin{bmatrix} X_1(k) \\ X_2(k) \\ X_3(k) \\ X_4(k) \end{bmatrix} + \quad (4)$$

$$\begin{bmatrix} 0 \\ 0 \\ 0 \\ 1 \end{bmatrix} FAF(k) + \begin{bmatrix} 1 \\ 0 \\ 0 \\ 0 \end{bmatrix} d(k)$$

The equation (4) is solved, and then the following relation is introduced.

$$X(k+1)=aX_1(k)+bX_2(k)+d(k)=\lambda(k+1) \quad (5)$$

In addition, the state variables are expressed as follows.

$$X_1(k+1)=\lambda(k+1)$$

$$X_2(k+1)=FAF(k-2)$$

$$X_3(k+1)=FAF(k-1)$$

$$X_4(k+1)=FAF(k) \quad (6)$$

(3) Designing of Integral-added Regulator

A regulator is designed by using the equations (3) and (6). Feedback gains (a feedback gain vector) $K=[K_1, K_2, K_3, K_4]$ and the state variables $X^T(k)=[\lambda(k), FAF(k-3), FAF(k-2), FAF(k-1)]$ are used, and thus the following relation is obtained.

$$\begin{aligned} FAF(k) &= K \cdot X^T(k) \quad (7) \\ &= K_1 \cdot \lambda(k) + K_2 \cdot FAF(k-3) + \\ &\quad K_3 \cdot FAF(k-2) + K_4 \cdot FAF(k-1) \end{aligned}$$

When an integral term $Z_1(k)$ for absorbing errors is added, the equation (7) is modified into the following equation.

$$FAF(k)=K_1\cdot\lambda(k)+K_2\cdot FAF(k-3)+K_3\cdot FAF(k-2)+K_4\cdot FAF(k-1)+Z_1(k) \quad (8)$$

In this way, the A/F ratio corrective coefficient FAF is determined. The integral term Z(k) corresponds to the accumulation of the difference between a target A/F ratio ) λTG and an actual A/F ratio λ(k). Specifically, the integral term $Z_1(k)$ is given by the following equation.

$$Z_1(k)=Z_1(k-1)+Ka\cdot\{\lambda TG-\lambda(k)\} \quad (9)$$

where Ka denotes an integral constant.

Figure 2:
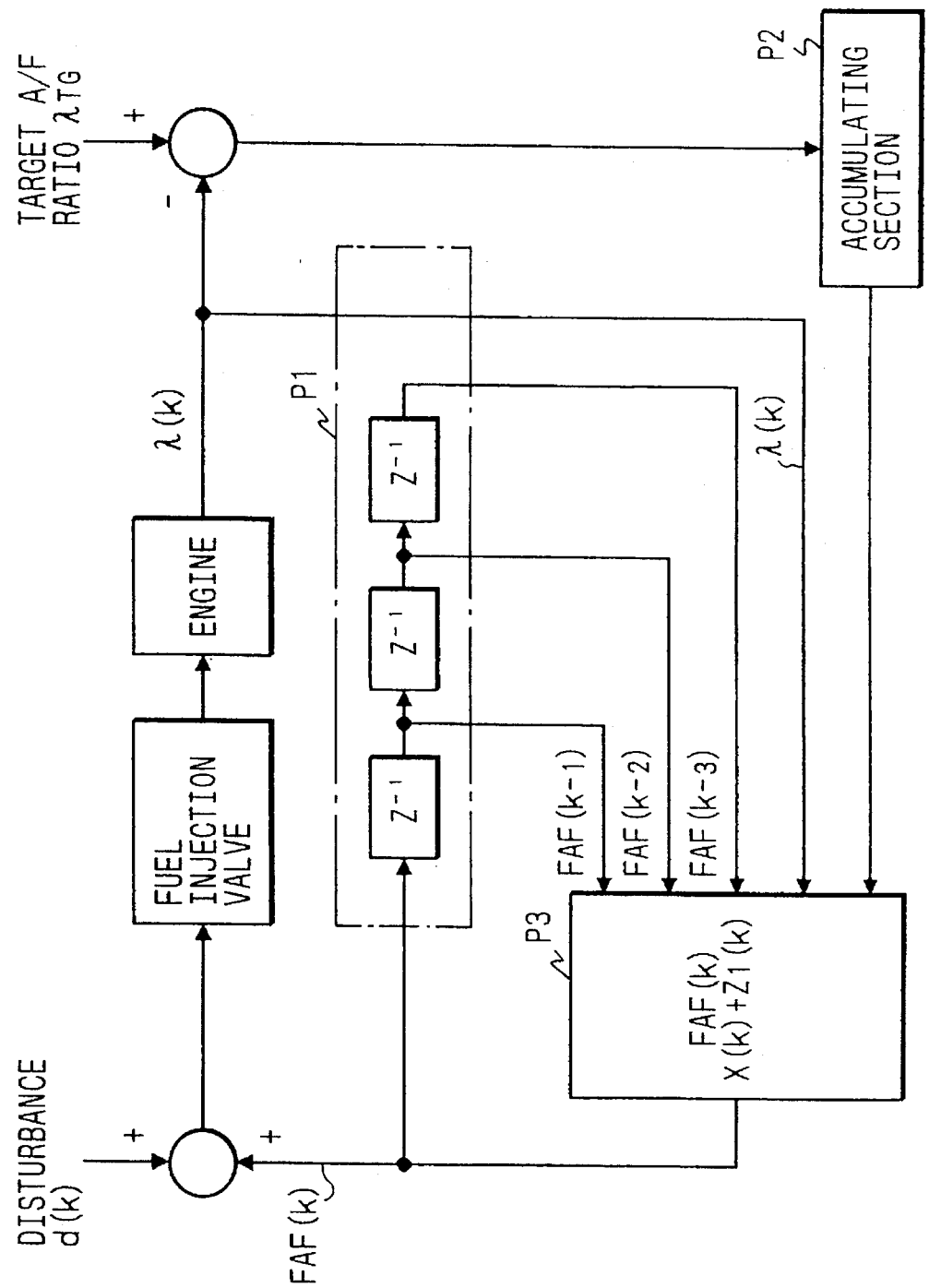
FIG. 2 is a block diagram of the A/F ratio control system in FIG. 1.

FIG. 2 is a block diagram of the system for controlling the A/F ratio which is designed as previously described. In FIG. 2, a block P1 shown by the broken lines corresponds to the section of the system which determines the state variables X(k) under conditions where the actual A/F ratio λ(k) is feedback-controlled at the target A/F ratio λTG. A block P2 corresponds to the accumulating section of the system which calculates the integral term $Z_1(k)$. A block P3 corresponds to the section of the system which calculates the current A/F ratio corrective value FAF(k) from the state variables X(k) and the integral term $Z_1(k)$ determined by the blocks P1 and P2 respectively. In addition, blocks of $Z^{-1}$ transform represent functions of deriving the values FAF(k-1), FAF(k-2), and FAF(k-3) from the values FAF(k), FAF(k-1), and FAF(k-2) respectively. For example, the $Z^{-1}$ transform block deriving the value FAF(k-1) from the value FAF(k) corresponds to the fact that the value FAF(k-1) used in a certain execution cycle (a certain moment) of the control has been stored in the RAM 34, and the value FAF(k-1) is read out from the RAM 34 and is used in the next execution cycle (the next moment) of the control. The other $Z^{-1}$ transform blocks correspond to similar facts.

(4) Determination of Optimal Feedback Gains K

Optimal feedback gains (an optimal feedback gain vector) K and an optimal integral constant Ka can be determined by minimizing the following performance index or function J.

$$J = \sum_{k=0}^{\infty} [Q\{\lambda(k)-\lambda TG\}^2 + R\{FAF(k)-FAF(k-1)\}^2] \quad (10)$$

where Q and R denote weight parameters. The performance index J is intended to minimize the deviation of the actual A/F ratio λ(k) from the target A/F ratio λTG while restricting the motion of the A/F ratio corrective coefficient FAF(k). The weight to the restriction on the A/F ratio corrective coefficient FAF(k) can be varied in accordance with the weight parameters Q and R. In general, the optimal feedback gains K and the optimal integral constant Ka are determined by changing the weight parameters Q and R and repeating simulation until optimal control characteristics are obtained. In addition, the optimal feedback gains K and the optimal integral constant Ka depend on the model constants "a" and "b". Accordingly, to ensure the system stability (robustness) against variations (parameter variations) in the system controlling the A/F ratio, it is necessary to consider variations of the model constants "a" and "b" in the designing of the optimal feedback gains K and the optimal integral constant Ka. Thus, the simulation is performed while variations of the model constants "a" and "b" which can actually occur are considered, so that the optimal feedback gains K and the optimal integral constant Ka capable of satisfying the stability are obtained.

The previously-mentioned modeling of the controlled object, method of representing the state variables X, designing of the integral-added regulator, and determination of the optimal feedback gains K are performed beforehand. The control unit 31 merely uses the results of these processes, and executes the A/F ratio control by referring to the equations (8) and (9).

As previously described, the control unit 31 operates in accordance with a program stored in the ROM 33. The program includes a main routine and various subroutines, one of which is a fuel injection rate calculation routine. The fuel injection rate calculation routine is executed in synchronism with the rotation of the crankshaft of the engine 1. Specifically, the fuel injection rate calculation routine is reiterated at a given period corresponding to 360° in crank angle.

Figure 3:
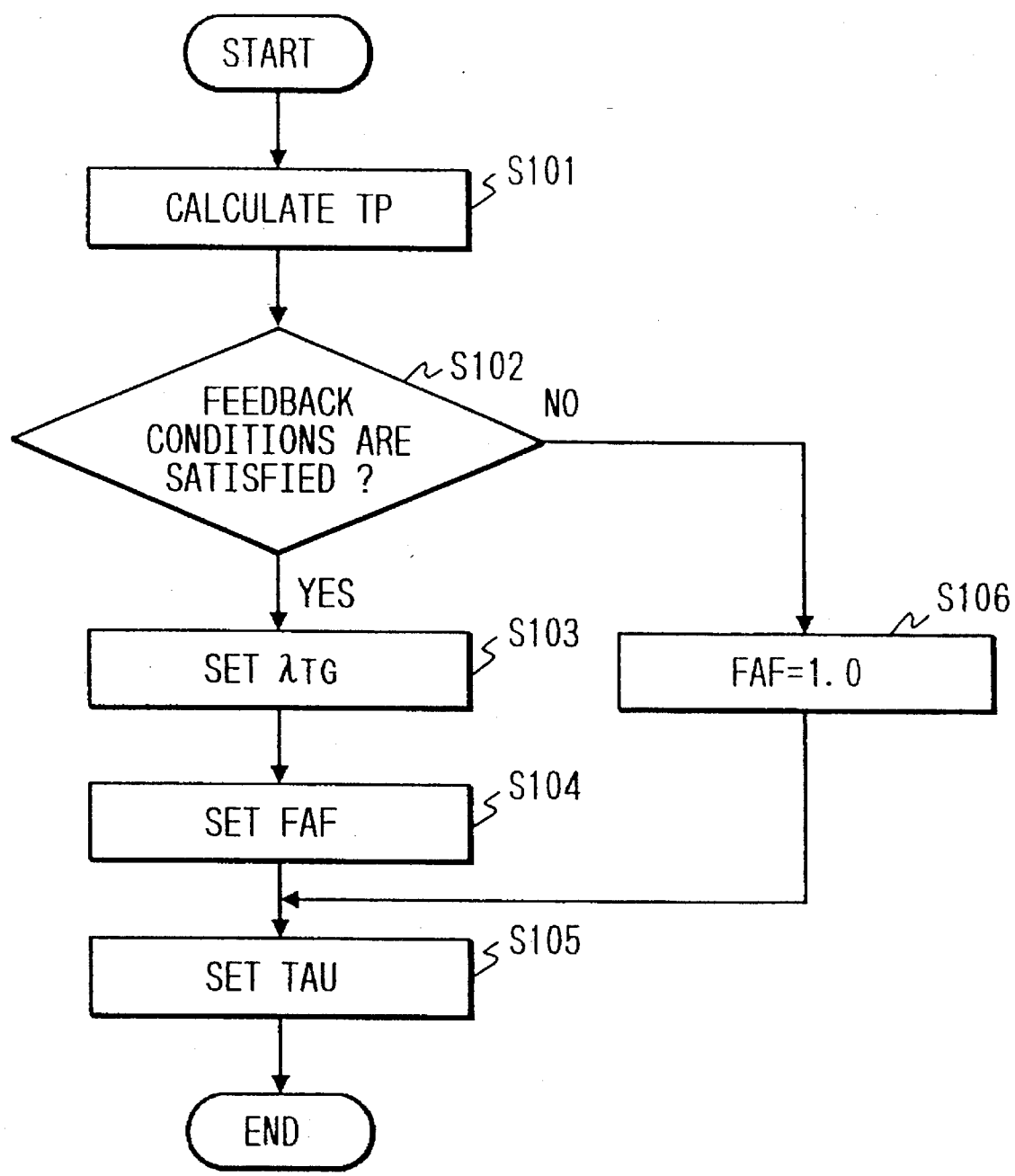
FIG. 3 is a flowchart of a fuel injection rate calculation routine in a program for operating a control unit in FIG. 1.

FIG. 3 is a flowchart of the fuel injection rate calculation routine. As shown in FIG. 3, a first step S101 of the fuel injection rate calculation routine computes a basic fuel injection rate (a basic amount of fuel injected during a fuel injection process) TP on the basis of engine operating conditions including the current intake air pressure PM and the current engine speed Ne.

A step S102 following the step S101 determines whether or not given conditions for the execution of feedback control of the A/F ratio are satisfied. The given conditions agree with conditions where the coolant temperature Thw is equal to or higher than a reference temperature and the engine 1 is operating outside given high-speed and heavy-load ranges. The given conditions are determined to be satisfied, the program advances from the step S102 to a block S103. Otherwise, the program advances from the step S101 to a step S106.

The block S103 sets a target A/F ratio $\lambda TG$ as will be described later. A step S104 following the block S103 sets an A/F ratio corrective coefficient FAF designed to make an actual A/F ratio $\lambda$ equal to the target A/F ratio $\lambda TG$. Specifically, the step S104 derives the current actual A/F ratio $\lambda(k)$ from the output signal of the A/F ratio sensor 26, and then calculates the A/F ratio corrective coefficient FAF from the target A/F ratio $\lambda TG$ and the actual A/F ratio $\lambda(k)$ by referring to the equations (8) and (9). After the step S104, the program advances to a step S105.

The step S106 sets the A/F ratio corrective coefficient FAF to "1". After the step S106, the program advances to the step S105.

The step S105 calculates a target fuel injection rate (a target amount of fuel injected during a fuel injection process) TAU from the basic fuel injection rate TP, the A/F ratio corrective coefficient FAF, and another corrective coefficient FALL by referring to the equation as "TAU=TP×FAF× FALL". After the step S105, the current execution cycle of the fuel injection rate calculation routine ends.

The control unit 31 generates a fuel injection control signal on the basis of the target fuel injection rate TAU, and outputs the fuel injection control signal to the fuel injection valves 7. The time interval during which the fuel injection valves 7 remain open, that is, the fuel injection rate, is adjusted in response to the fuel injection control signal so that the actual A/F ratio of an air-fuel mixture fed to the engine 1 can be controlled at the target A/F ratio $\lambda TG$.

A detailed description will now be given of the block S103 of FIG. 3. The block S103 sets the target A/F ratio $\lambda TG$ in response to the output voltage VOX2 of the $O_2$ sensor 27. Generally, the output voltage VOX2 of the $O_2$ sensor 27 tends to fluctuate with variations in the actual A/F ratio $\lambda$ under certain conditions. To remove such a fluctuation which would decrease the stability of the A/F ratio control, the output voltage VOX2 of the $O_2$ sensor 27 is averaged into a mean voltage VOX2AV. The A/F ratio control responds to the mean voltage VOX2AV. The block S103 includes a routine for averaging the output voltage VOX2 of the $O_2$ sensor 27. The control unit 31 iteratively samples the output voltage VOX2 of the $O_2$ sensor 27 at a period of 32 msec, and the CPU 32 is iteratively informed of the sample of the output voltage VOX2 of the $O_2$ sensor 27 at the same period. The voltage averaging routine is executed each time the CPU 32 is informed of the sample of the output voltage VOX2 of the $O_2$ sensor 27.

Figure 4:
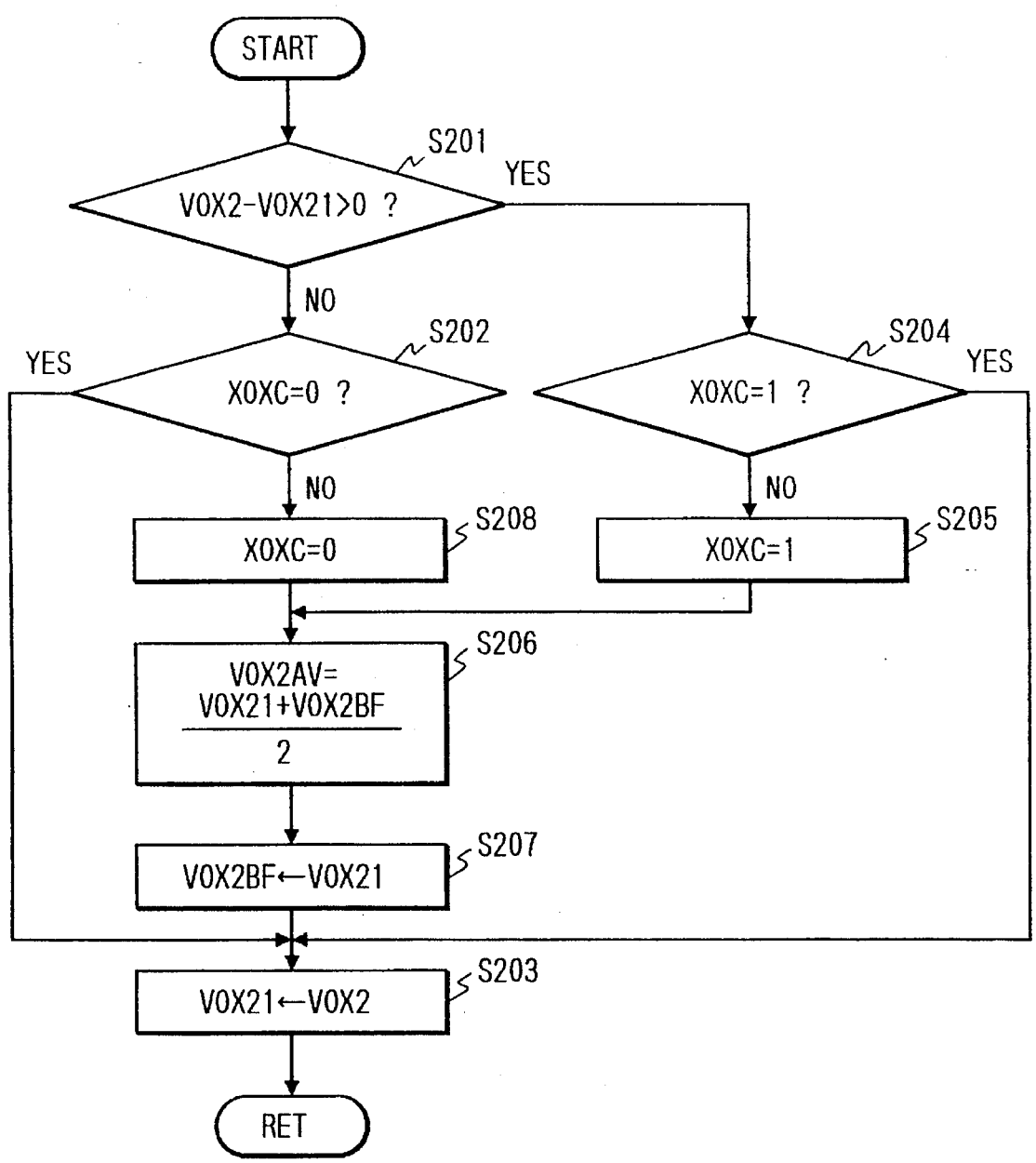
FIG. 4 is a flowchart of a voltage averaging routine in the program for operating the control unit in FIG. 1.

FIG. 4 is a flowchart of the voltage averaging routine. As shown in FIG. 4, a first step S201 of the voltage averaging routine calculates the difference value which is equal to the present value VOX2 minus the preceding value VOX21 of the output voltage of the $O_2$ sensor 27. Then, the step S201 compares the calculated difference value with zero. When the difference value is equal to or smaller than zero, that is, when the difference value indicates a variation in the A/F ratio toward a lean side, the program advances from the step S201 to a step S202. When the difference value is greater than zero, that is, when the difference value indicates a variation in the A/F ratio toward a rich side, the program advances from the step S201 to a step S204. It should be noted that the output voltage of the $O_2$ sensor 27 increases as the A/F ratio varies from a lean side toward a rich side.

The step S202 determines whether or not an enriching variation flag XOXC is cleared. When the enriching variation flag XOXC is determined to be cleared, the program jumps from the step S202 to a step S203. Otherwise, the program advances from the step S202 to a step S208 which clears the enriching variation flag XOXC. After the step S208, the program advances to a step S206.

The step S203 updates the preceding value VOX21 of the output voltage of the $O_2$ sensor 27 by setting the preceding value VOX21 equal to the present value VOX2. The updated preceding value VOX21 is stored into the RAM 34. After the step S203, the current execution cycle of the voltage averaging routine ends and the program returns to the main routine.

The step S204 determines whether or not the enriching variation flag XOXC is set. When the enriching variation flag XOXC is determined to be set, the program jumps from the step S204 to the step S203. Otherwise, the program advances from the step S204 to a step S205 which sets the enriching variation flag XOXC. After the step S205, the program advances to the step S206.

The step S206 averages the preceding value VOX21 and a newest peak value VOX2BF of the output voltage of the $O_2$ sensor 27 into a mean value VOX2AV by referring to the equation as "VOX2AV=(VOX21+VOX2BF)/2". The newest peak value VOX2BF is read out from the RAM 34. A step S207 following the step S206 updates the newest peak value VOX2BF by setting the newest peak value VOX2BF equal to the preceding value VOX21. The updated newest peak value VOX2BF is stored into the RAM 34. After the step S207, the program advances to the step S203.

Figure 5:
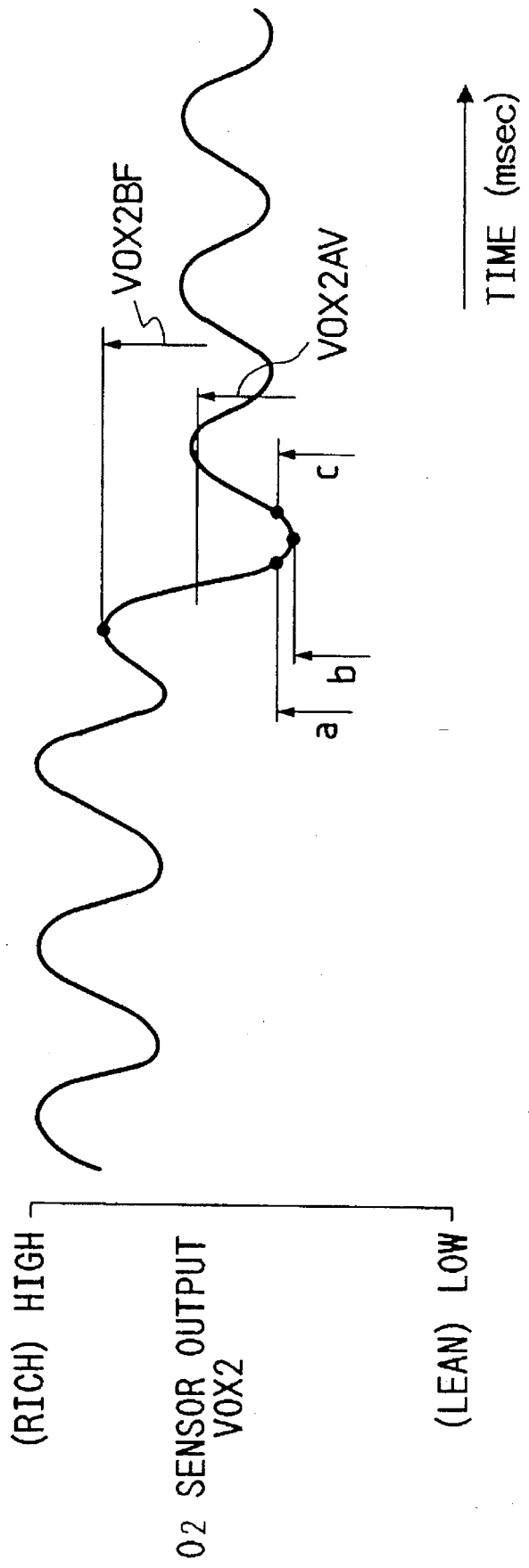
FIG. 5 is a time-domain diagram of the output voltage of an $O_2$ sensor in FIG. 1.

The enriching variation flag XOXC indicates whether or not the A/F ratio varies toward a rich side at the moment of the preceding sampling of the output voltage of the $O_2$ sensor 27. It is now assumed that, as shown in FIG. 5, the current sample "b" of the output voltage of the $O_2$ sensor 27 indicates a leaner-side value than the value of the preceding sample "a" thereof, and the enriching variation flag XOXC is cleared. Under these conditions, the difference value "VOX2–VOX21" (which corresponds to the difference value equal to the current sample "b" minus the preceding sample "a") is equal to or smaller than zero so that the program advances from the step S201 to the step S202. Since the enriching variation flag XOXC is cleared, the program advances from the step S202 to the step S203. The step S203 updates the preceding value VOX21 of the output voltage of the $O_2$ sensor 27 by setting the preceding value VOX21 equal to the current value VOX2.

It is now assumed that, as shown in FIG. 5, a sample "c" of the output voltage of the $O_2$ sensor 27 which temporally follows the sample "b" indicates a richer-side value than the value of the preceding sample "b". In this case, the difference value "VOX2–VOX21" (which corresponds to the difference value equal to the current sample "c" minus the preceding sample "b") is greater than zero so that the program advances from the step S201 to the step S204. Since the enriching variation flag XOXC is cleared as previously described, the program advances from the step S204 to the step S205. The step S205 sets the enriching variation flag XOXC. Then, the step S206 averages the preceding value VOX21 and a newest peak value VOX2BF of the output voltage of the $O_2$ sensor 27 into a mean value VOX2AV. Subsequently, the step S207 updates the newest peak value VOX2BF by setting the newest peak value VOX2BF equal to the preceding value VOX21. After the step S207, the program advances to the step S203.

In cases where the direction of a variation in the output voltage of the $O_2$ sensor 27 changes from a rich-side pointing direction to a lean-side pointing direction, the program advances from the step S201 to the step S202. Since the enriching variation flag XOXC is set, the program advances from the step S202 to the step S208. The step S208 clears the enriching variation flag XOXC. Then, the step S206 averages the preceding value VOX21 and a newest peak value VOX2BF of the output voltage of the $O_2$ sensor 27 into a mean value VOX2AV.

Figure 6:
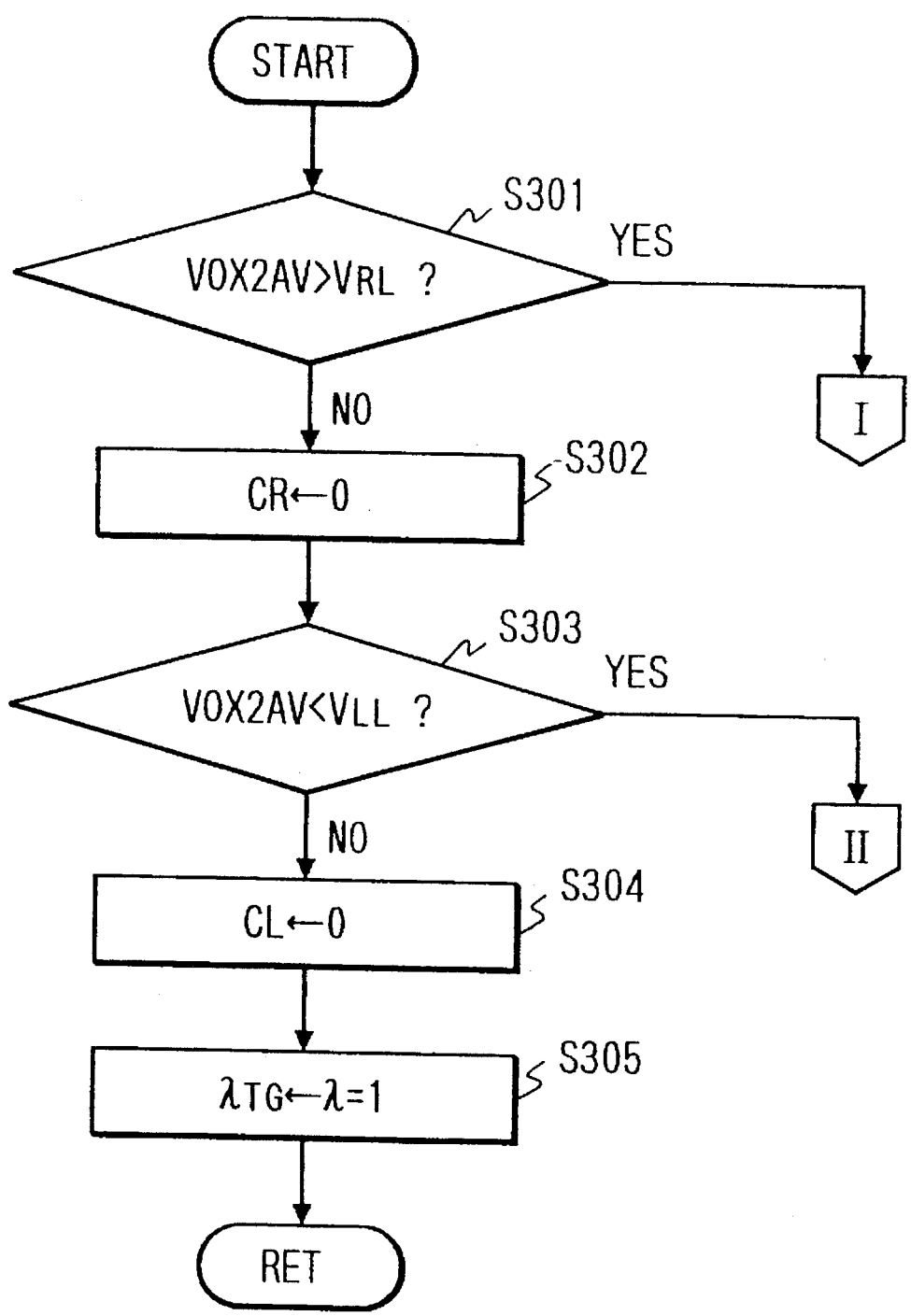
FIGS. 6 to 8 are a flowchart of a saturation skip control routine in the program for operating the control unit in FIG. 1.
Figure 7:
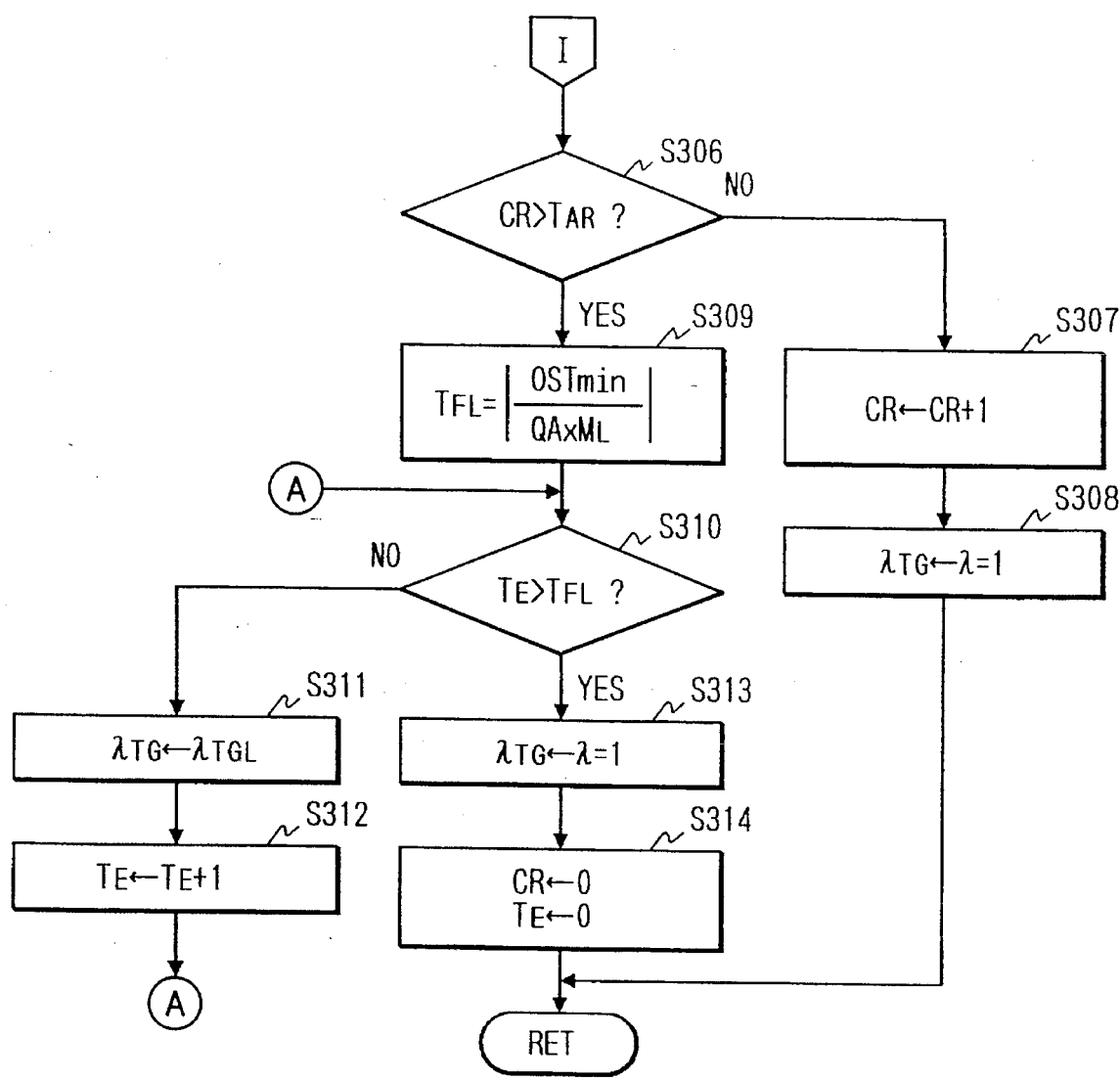
Figure 8:
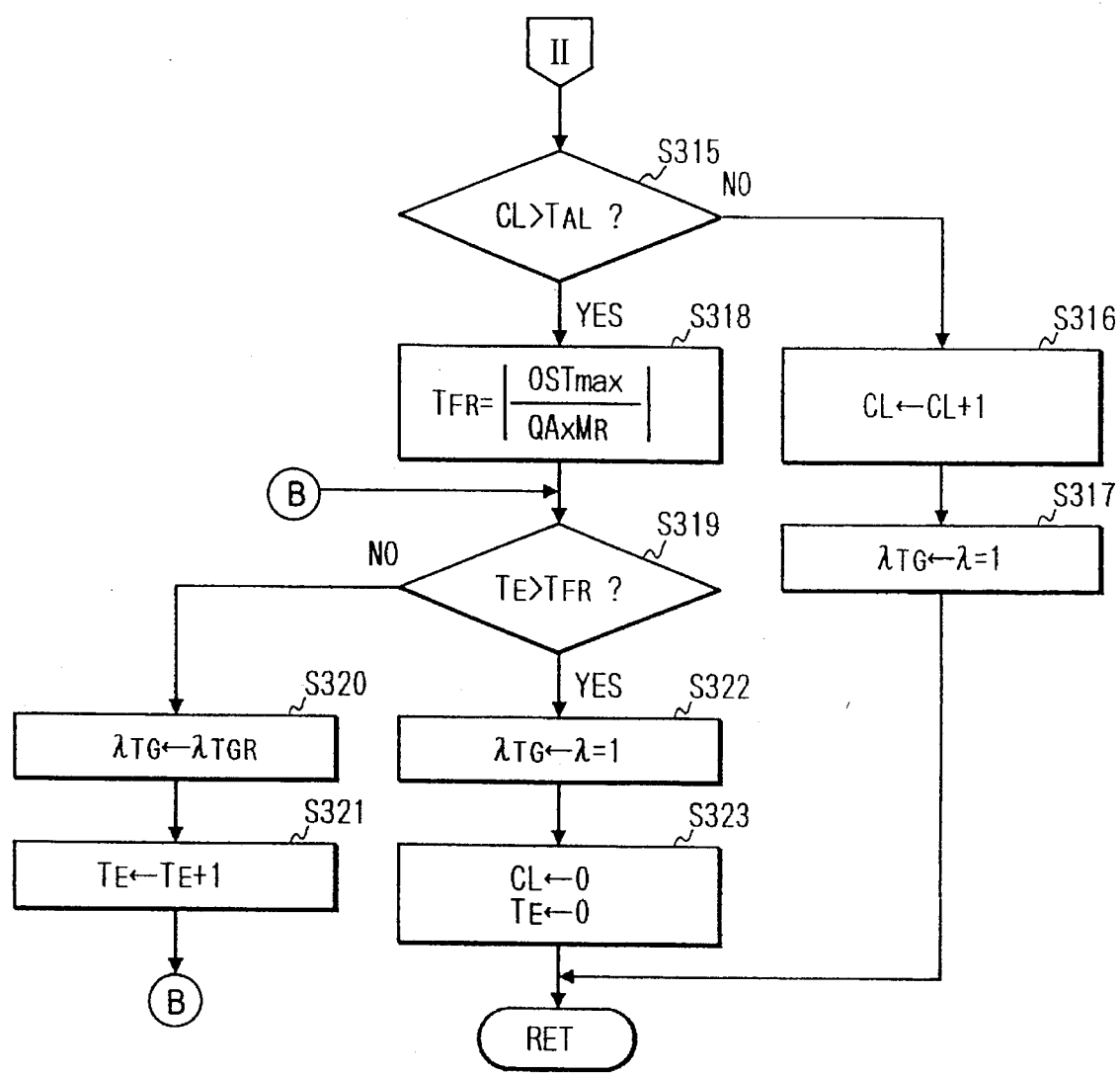

The block S103 of FIG. 3 includes a saturation skip control routine for setting the target A/F ratio $\lambda$TG in accordance with the mean value VOX2AV of the output voltage of the $O_2$ sensor 27. The saturation skip control routine is iteratively executed at a period of 32 msec. FIGS. 6–8 are a flowchart of the saturation skip control routine.

As shown in FIG. 6, a first step S301 of the saturation skip control routine determines whether or not the mean value VOX2AV of the output voltage of the $O_2$ sensor 27 exceeds a rich-side allowable limit value VRL. When the mean value VOX2AV exceeds the rich-side allowable limit value VRL, that is, when the A/F ratio $\lambda$ is in a given rich range, the program advances from the step S301 to a step S306 of FIG. 7. Otherwise, the program advances from the step S301 to a step S302.

The step S302 resets a counter value CR to zero. As will be made clear later, the counter value CR indicates the length of time during which the A/F ratio $\lambda$ remains in the given rich range.

A step S303 following the step S302 determines whether or not the mean value VOX2AV of the output voltage of the $O_2$ sensor 27 is smaller than a lean-side allowable limit value VLL. When the mean value VOX2AV is smaller than the lean-side allowable limit value VLL, that is, when the A/F ratio $\lambda$ is in a given lean range, the program advances from the step S303 to a step S315 of FIG. 8. Otherwise, the program advances from the step S303 to a step S304.

The step S304 resets a counter value CL to zero. As will be made clear later, the counter value CL indicates the length of time during which the A/F ratio $\lambda$ remains in the given lean range. A step S305 following the step S304 sets the target A/F ratio $\lambda$TG to a value corresponding to the stoichiometric A/F ratio "$\lambda$=1". After the step S305, the current execution cycle of the saturation skip control routine ends and the program returns to the main routine.

As understood from the previous description, in cases where the mean value VOX2AV of the output voltage of the $O_2$ sensor 27 indicates that the A/F ratio $\lambda$ remains between the given rich range and the given lean range, the target A/F ratio ) $\lambda$TG is held at the stoichiometric A/F ratio "$\lambda$=1 ".

The step S306 of FIG. 7 determines whether or not the rich-side counter value CR exceeds a reference number TAR. When the rich-side counter value CR exceeds the reference number TAR, that is, when the A/F ratio $\lambda$ has been in the given rich range for longer than a given time, the program advances from the step S306 to a step S309. Otherwise, the program advances from the step S306 to a step S307.

The step S307 increments the rich-side counter value CR by one. A step S308 following the step S307 sets the target A/F ratio $\lambda$TG to the stoichiometric A/F ratio "$\lambda$=1". After the step S308, the current execution cycle of the saturation skip control routine ends and the program returns to the main routine.

The step S309 calculates a correction period value TFL by referring to the equation as "TFL=|OSTmin/(QA×ML)|" where QA denotes the current rate of air flow into the engine 1 and ML denotes a specific-component concentration in the exhaust gas, and OSTmin denotes a minimum absorbed amount. After the step S309, the program advances to a step S310.

The step S310 determines whether or not a counter value TE exceeds the correction period value TFL. When the counter value TE exceeds the correction period value TFL, the program advances from the step S310 to a step S313. Otherwise, the program advances from the step S310 to a step S311.

The step S311 sets the target A/F ratio $\lambda$TG to a predetermined lean-side A/F ratio $\lambda$TGL. A step S312 following the step S311 increments the counter value TE by one. After the step S312, the program returns to the step S310. Thus, the steps S310, S311, and S312 remain repeated until the counter value TE exceeds the correction period value TFL.

The step S313 sets the target A/F ratio $\lambda$TG to the stoichiometric A/F ratio "$\lambda$=1". A step S314 following the step S313 resets the counter values CR and TE to zero. After the step S314, the current execution cycle of the saturation skip control routine ends and the program returns to the main routine.

The step S315 of FIG. 8 determines whether or not the lean-side counter value CL exceeds a reference number TAL. When the lean-side counter value CL exceeds the reference number TAL, that is, when the A/F ratio $\lambda$ has been in the given lean range for longer than a given time, the program advances from the step S315 to a step S318. Otherwise, the program advances from the step S315 to a step S316.

The step S316 increments the lean-side counter value CL by one. A step S317 following the step S316 sets the target A/F ratio $\lambda$TG to the stoichiometric A/F ratio "$\lambda$=1". After the step S317, the current execution cycle of the saturation skip control routine ends and the program returns to the main routine.

The step S318 calculates a correction period value TFR by referring to the equation as "TFR=|OSTmax/(QA××MR)|" where QA denotes the current rate of air flow into the engine 1 and MR denotes a specific-component concentration in the exhaust gas, and OSTmax denotes a maximum absorbed amount. After the step S318, the program advances to a step S319.

The step S319 determines whether or not a counter value TE exceeds the correction period value TFR. When the counter value TE exceeds the correction period value TFR, the program advances from the step S319 to a step S322. Otherwise, the program advances from the step S319 to a step S320.

The step S320 sets the target A/F ratio $\lambda$TG to a predetermined rich-side A/F ratio $\lambda$TGR. A step S321 following the step S321 increments the counter value TE by one. After the step S321, the program returns to the step S319. Thus, the steps S319, S320, and S321 remain repeated until the counter value TE exceeds the correction period value TFR.

The step S322 sets the target A/F ratio $\lambda$TG to the stoichiometric A/F ratio "$\lambda$=1". A step S323 following the step S322 resets the counter values CL and TE to zero. After the step S323, the current execution cycle of the saturation skip control routine ends and the program returns to the main routine.

Figure 9:
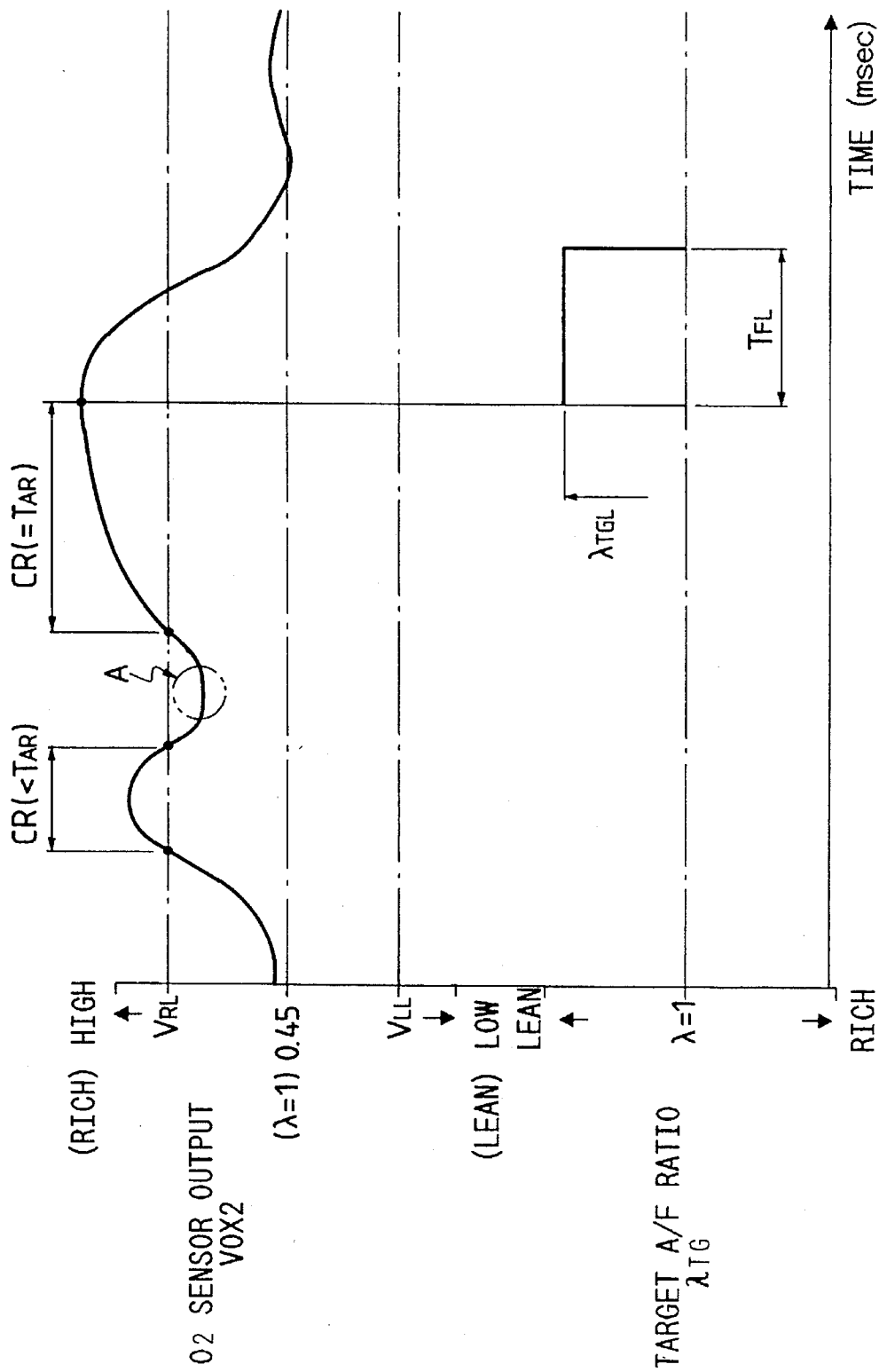
FIG. 9 is a time-domain diagram of the output voltage of the $O_2$ sensor in FIG. 1 and a target A/F ratio λTG.

As shown in FIG. 9, in the case where the mean value VOX2AV of the output voltage of the $O_2$ sensor 27 remains between the rich-side allowable limit value VRL and the lean-side allowable limit values VLL, the target A/F ratio λTG is held at the stoichiometric A/F ratio "λ=1" by the operation of the steps S301, S303, and S305.

In the case where the mean value VOX2AV of the output voltage of the $O_2$ sensor 27 remains greater than the rich-side allowable limit value VRL for shorter than a reference period determined by the reference number TAR, the target A/F ratio λTG is held at the stoichiometric A/F ratio "λ=1" by the operation of the steps S306 and S308. On the other hand, in the case where the mean value VOX2AV of the output voltage of the $O_2$ sensor 27 remains greater than the rich-side allowable limit value VRL for longer than the reference period determined by the reference number TAR, the target A/F ratio λTG is changed from the stoichiometric A/F ratio "λ=1" to the predetermined lean-side A/F ratio λTGL by the operation of the steps S306 and S311. Then, the target A/F ratio λTG is held at the predetermined lean-side A/F ratio λTGL for the correction period TFL. This process results from the iterative execution of the steps S310, S311, and S312. When the correction period TFL elapses, the target A/F ratio λTG is returned to the stoichiometric A/F ratio "λ=1" by the operation of the steps S310 and S313.

The rich-side allowable limit value VRL and the reference period determined by the reference number TAR are predetermined conditions used in detecting a rich-side saturation of the catalytic converter 13. The fact that the mean value VOX2AV of the output voltage of the $O_2$ sensor 27 remains greater than the rich-side allowable limit value VRL for longer than the reference period determined by the reference number TAR is regarded as an indication of conditions where the catalytic converter 13 is saturated in a rich side and thus the catalytic converter 13 can not absorb CO and HC in the exhaust gas any more. Under the rich-side saturated conditions, the target A/F ratio λTG is changed to the predetermined lean-side A/F ratio λTGL to recover the catalytic converter 13. As previously described, the target A/F ratio λTG is held at the predetermined lean-side A/F ratio λTGL for the correction period TFL.

Figure 10:
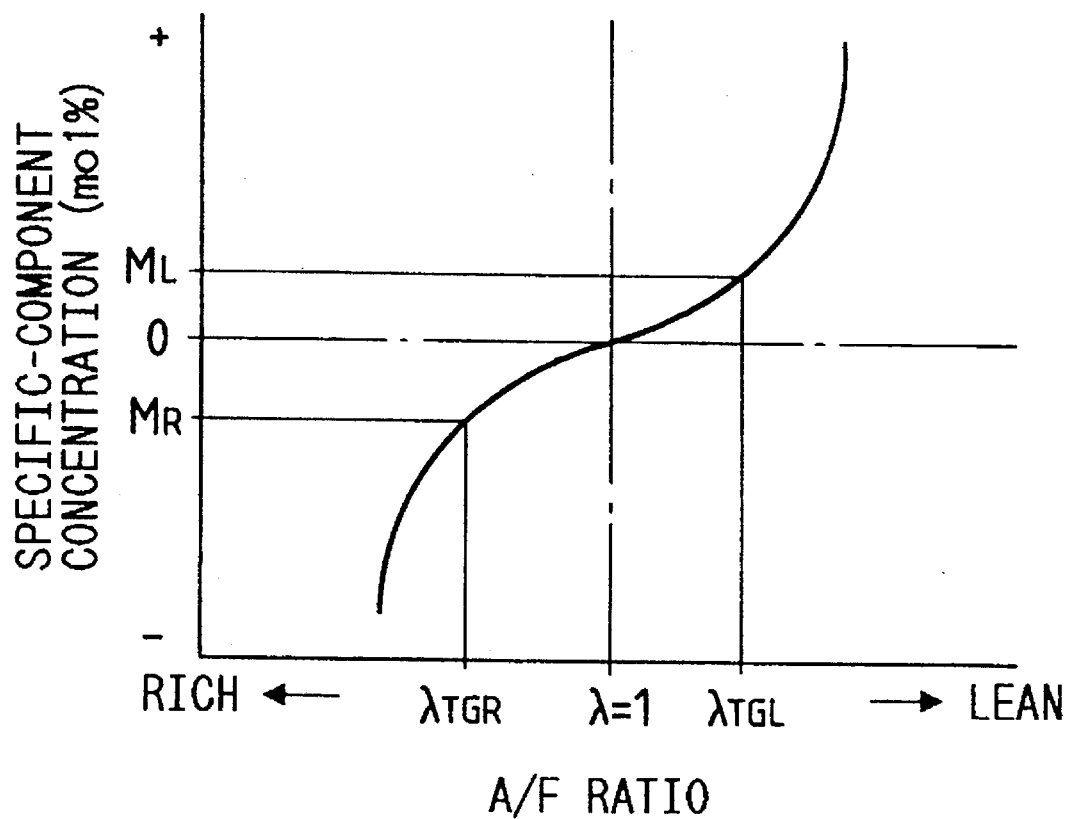
FIG. 10 is a diagram of the relation between an A/F ratio and a specific-component concentration in exhaust gas.

The step S309 calculates the correction period value TFL by referring to the equation as "TFL=|OSTmin/(QA×ML)|". As shown in FIG. 10, the specific-component concentration in the exhaust gas varies with the A/F ratio λ. Map information of the relation between the specific-component concentration and the A/F ratio λ in FIG. 10 is previously stored in the ROM 33 or the backup RAM 35. In FIG. 10, the specific-component concentration is equal to zero at the stoichiometric A/F ratio "λ=1". The specific-component concentration increases in a positive range as the A/F ratio λ moves from the stoichiometric A/F ratio "λ=1" toward a leaner side. The specific-component concentration changes in a negative range as the A/F ratio λ moves from the stoichiometric A/F ratio "λ=1" toward a richer side. Generally, the NOx and $O_2$ concentrations in the exhaust gas increase as the A/F ratio λ moves from the stoichiometric A/F ratio "λ=1" toward a leaner side. On the other hand, the CO and HC concentrations in the exhaust gas increase as the A/F ratio λ moves from the stoichiometric A/F ratio "λ=1" toward a richer side. In FIG. 10, the specific-component concentration is defined as corresponding to the $O_2$ concentration. Thus, the specific-component concentration is positive at A/F ratios in a lean side. On the other hand, the specific-component concentration is negative at A/F ratios in a rich side. Negative specific-component concentrations mean $O_2$ amounts (concentrations) necessary to convert CO and HC, trapped by the catalytic converter 13, into nontoxic components. The specific-component concentration which occurs at the predetermined lean-side A/F ratio λTGL is used as the specific-component concentration ML in the equation for calculating the correction period TFL. The current air flow rate QA is determined by the current engine speed Ne and the current intake air pressure PM. In the equation for calculating the correction period TFL, the product of the current air flow rate QA and the specific-component concentration ML indicates the $O_2$ flow rate in the engine exhaust system. In addition, the minimum absorbed amount OSTmin corresponds to a maximum amount of CO and HC absorbed by the catalytic converter 13 under conditions where the catalytic converter 13 is saturated in a rich side. Since an $O_2$ amount is used as a reference for expressing the minimum absorbed amount OSTmin, the minimum absorbed amount OSTmin is negative. The minimum absorbed amount OSTmin varies as the catalytic converter 13 is deteriorated. As will be described later, the minimum absorbed amount OSTmin is iteratively updated by a learning process. The step S309 uses the newest minimum absorbed amount OSTmin. As a result of holding the target A/F ratio λTG at the predetermined lean-side A/F ratio λTGL for the correction period TFL, a suitable amount of $O_2$ is fed to the catalytic converter 13 and thus all of CO and HC trapped therein reacts with $O_2$. Accordingly, all of CO and HC is removed from the catalytic converter 13, and the catalytic converter 13 is recovered.

In the case where the mean value VOX2AV of the output voltage of the $O_2$ sensor 27 remains smaller than the lean-side allowable limit value VLL for shorter than a reference period determined by the reference number TAL, the target A/F ratio λTG is held at the stoichiometric A/F ratio "λ=1" by the operation of the steps S315 and S317. On the other hand, in the case where the mean value VOX2AV of the output voltage of the $O_2$ sensor 27 remains smaller than the lean-side allowable limit value VLL for longer than the reference period determined by the reference number TAL, the target A/F ratio λTG is changed from the stoichiometric A/F ratio "λ=1" to the predetermined rich-side A/F ratio λTGR by the operation of the steps S315 and S320. Then, the target A/F ratio λTG is held at the predetermined rich-side A/F ratio λTGR for the correction period TFR. This process results from the iterative execution of the steps S319, S320, and S321. When the correction period TFR elapses, the target A/F ratio λTG is returned to the stoichiometric A/F ratio "λ=1" by the operation of the steps S319 and S322.

The lean-side allowable limit value VLL and the reference period determined by the reference number TAL are predetermined conditions used in detecting a lean-side saturation of the catalytic converter 13. The fact that the mean value VOX2AV of the output voltage of the $O_2$ sensor 27 remains smaller than the lean-side allowable limit value VLL for longer than the reference period determined by the reference number TAL is regarded as an indication of conditions where the catalytic converter 13 is saturated in a lean side and thus the catalytic converter 13 can not absorb NOx in the exhaust gas any more. Under the lean-side saturated conditions, the target A/F ratio λTG is changed to the predetermined rich-side A/F ratio λTGR to recover the catalytic converter 13. As previously described, the target A/F ratio λTG is held at the predetermined rich-side A/F ratio λTGR for the correction period TFR.

The step S318 calculates the correction period value TFR by referring to the equation as "TFR=|OSTmax/QA×MR)|". As shown in FIG. 10, the specific-component concentration which occurs at the predetermined rich-side A/F ratio λTGR is used as the specific-component concentration MR in the equation for calculating the correction period TFR. The current air flow rate QA is determined by the current engine speed Ne and the current intake air pressure PM. In the equation for calculating the correction period TFR, the product of the current air flow rate QA and the specific-component concentration MR indicates the CO and HC flow rate in the engine exhaust system. In addition, the maximum absorbed amount OSTmax corresponds to a maximum amount of $O_2$ absorbed by the catalytic converter 13 under conditions where the catalytic converter 13 is saturated in a lean side. Since an $O_2$ amount is used as a reference for expressing the maximum absorbed amount OSTmax, the maximum absorbed amount OSTmax is positive. The maximum absorbed amount OSTmax varies as the catalytic converter 13 is deteriorated. As will be described later, the maximum absorbed amount OSTmax is iteratively updated by a leaning process. The step S318 uses the newest maximum absorbed amount OSTmax. As a result of holding the target A/F ratio λTG at the predetermined rich-side A/F ratio λTGR for the correction period TFR, a suitable amount of CO and HC is fed to the catalytic converter 13 and thus all of NOx and $O_2$ trapped therein reacts with CO and HC. Accordingly, all of NOx and $O_2$ is removed from the catalytic converter 13, and the catalytic converter 13 is recovered.

The control unit 31 receives the output signal of a sensor (not shown) for detecting the speed of a vehicle body powered by the engine 1. The control unit 31 calculates the distance traveled by the vehicle body on the basis of the output signal of the vehicle-body speed sensor. The program for operating the control unit 31 includes a learning start judgment routine. The learning start judgment routine is reiteratively executed during a certain period each time the distance traveled by the vehicle body increases by 2,000 km.

Figure 11:
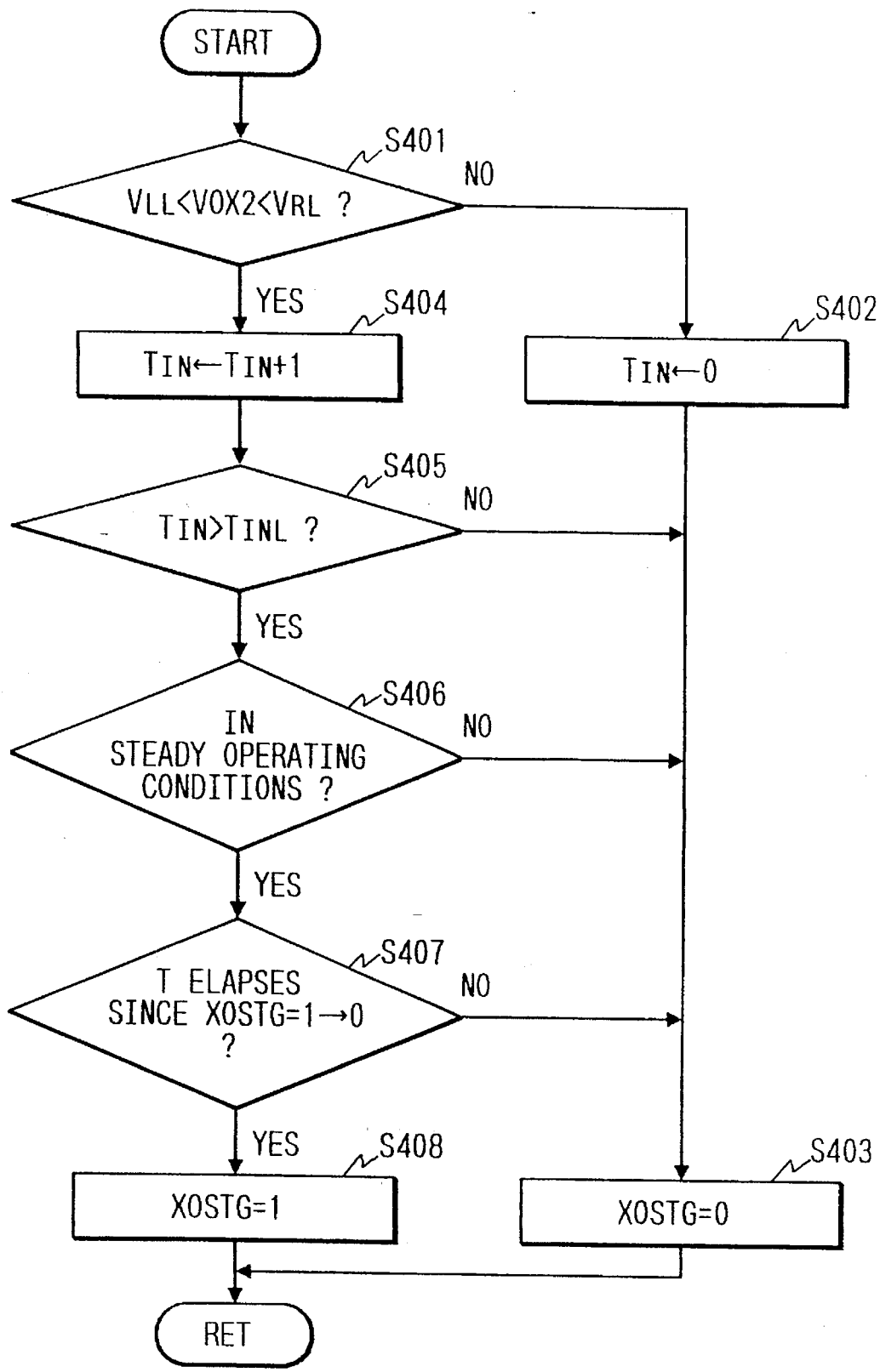
FIG. 11 is a flowchart of a learning start judgment routine in the program for operating the control unit in FIG. 1.

FIG. 11 is a flowchart of the learning start judgment routine. As shown in FIG. 11, a first step S401 of the learning start judgment routine determines whether or not the present value VOX2 of the output voltage of the $O_2$ sensor 27 exists between the rich-side allowable limit value VRL and the lean-side allowable limit value VLL. When the present value VOX2 of the output voltage of the $O_2$ sensor 27 exists between the rich-side allowable limit value VRL and the lean-side allowable limit value VLL, the program advances from the step S401 to a step S404. Otherwise, the program advances from the step S401 to a step $S4O_2$. It should be noted that the step S401 may use the mean value VOX2AV instead of the value VOX2.

The step S402 resets a counter value TIN to zero. The counter value TIN indicates a waiting time. A step S403 following the step S402 clears a learning execution flag XOSTG to zero. After the step S403, the current execution cycle of the learning start judgment routine ends and the program returns to the main routine.

The step S404 increments the counter value TIN by one. A step S405 following the step S404 determines whether or not the counter value TIN exceeds a predetermined number TINL. When the counter value TIN exceeds the predetermined number TINL, that is, when a given waiting time elapses, the program advances from the step S405 to a step S406. Otherwise, the program advances from the step S405 to the step S403.

The step S406 determines whether or not the engine 1 is in given steady operating conditions by referring to histories of the engine speed Ne and the intake air pressure PM. When the engine 1 is in the given steady operating conditions, the program advances from the step S406 to a step S407. Otherwise, the program advances from the step S406 to the step S403.

The step S407 determines whether or not a predetermined learning interval T has elapsed since the moment of clearing the learning execution flag XOSTG to zero. When the predetermined interval T has elapsed, the program advances from the step S407 to a step S408. Otherwise, the program advances from the step S407 to the step S403.

The step S408 sets the learning execution flag XOSTG to "1". After the step S408, the current execution cycle of the learning start judgment routine ends and the program returns to the main routine.

The program for operating the control unit 31 includes an A/F ratio variation control routine. The A/F ratio variation control routine is reiteratively executed during a certain period each time the distance traveled by the vehicle body increases by 2,000 km. The A/F ratio variation control routine follows the learning start judgment routine of FIG. 11.

Figure 12:
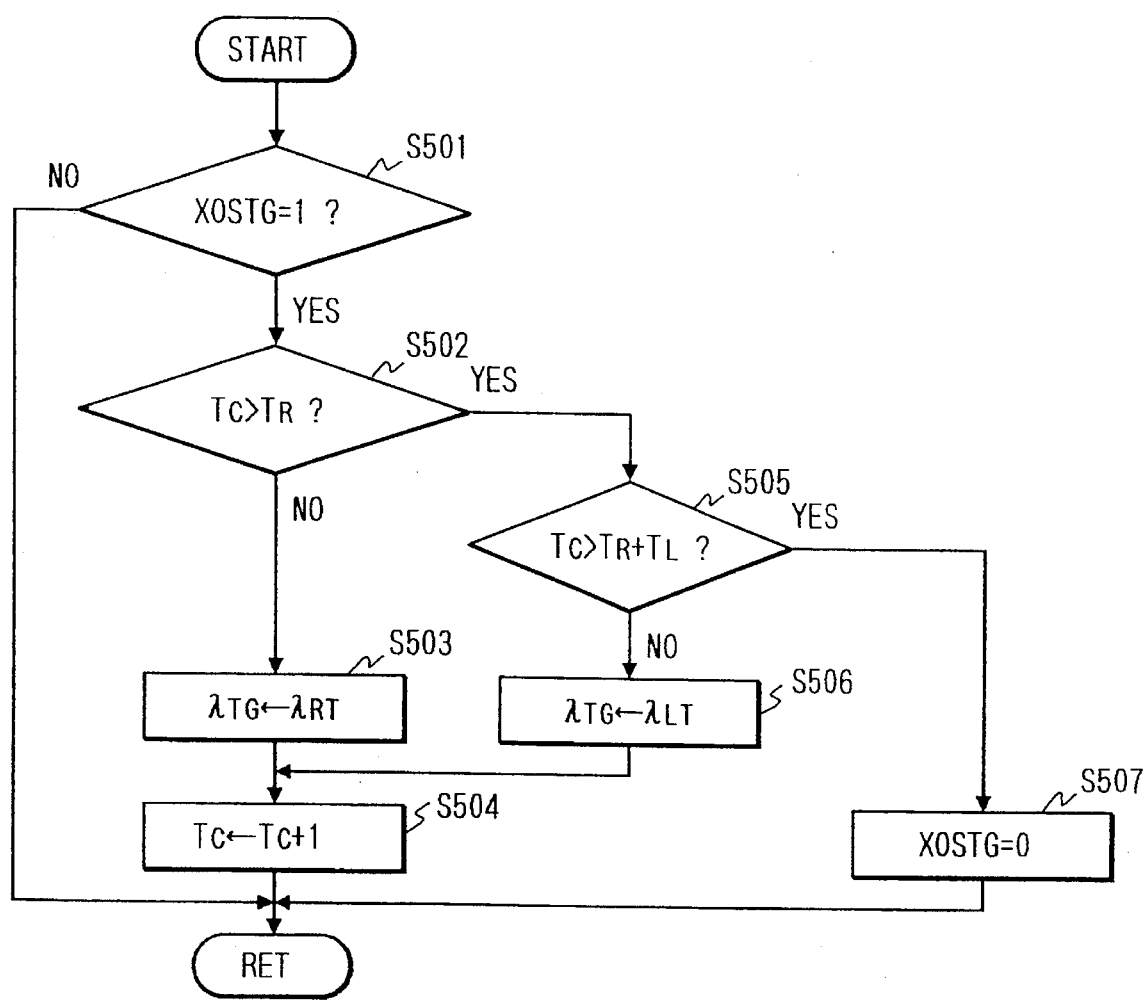
FIG. 12 is a flowchart of an A/F ratio variation control routine in the program for operating the control unit in FIG. 1.

FIG. 12 is a flowchart of the A/F ratio variation control routine. As shown in FIG. 12, a first step S501 of the A/F ratio variation control routine determines whether or not the learning execution flag XOSTG is set. When the learning execution flag XOSTG is determined to be set, the program advances from the step S501 to a step S502. Otherwise, the program exits from the step S501 and the current execution cycle of the A/F ratio variation control routine ends before the program returns to the main routine.

The step S502 determines whether or not a counter value TC exceeds a predetermined number TR. The predetermined number TR indicates a rich-side correction time. When the counter value TC exceeds the predetermined number TR, the program advances from the step S502 to a step S505. Otherwise, the program advances from the step S502 to a step S503.

The step S503 sets the target A/F ratio λTG to a predetermined rich-side A/F ratio λRT which corresponds to an airfuel mixture richer than the stoichiometric air-fuel mixture. After the step S503, the program advances to a step S504. The step S504 increments the counter value TC by one. After the step S504, the current execution cycle of the A/F ratio variation control routine ends and the program returns to the main routine.

The step S505 determines whether or not the counter value TC exceeds the sum of the predetermined number TR and a predetermined number TL. The predetermined number TL indicates a lean-side correction time. When the counter value TC exceeds the sum of the predetermined numbers TR and TL, the program advances from the step S505 to a step S507. Otherwise, the program advances from the step S505 to a step S506.

The step S507 clears the learning execution flag XOSTC to zero. After the step S507, the current execution cycle of the A/F ratio variation control routine ends and the program returns to the main routine.

The step S506 sets the target A/F ratio λTG to a predetermined lean-side A/F ratio λLT which corresponds to an air-fuel mixture leaner than the stoichiometric air-fuel mixture. After the step S506, the program advances to the step S504.

Figure 15:
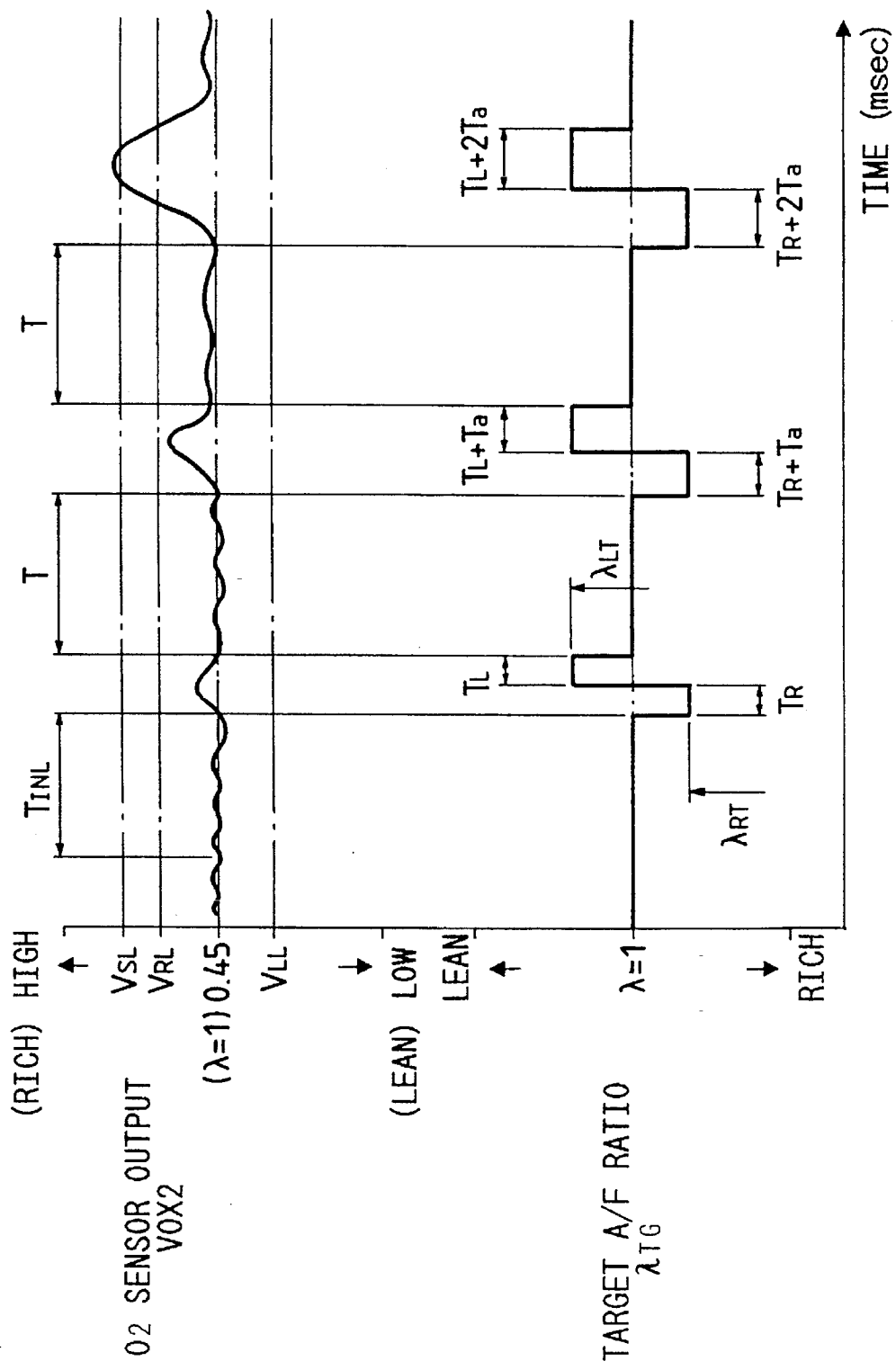
FIG. 15 is a time-domain diagram of the output voltage of the sensor in FIG. 1 and the target A/F ratio λTG.

As shown in FIG. 15, when the present value VOX2 of the output voltage of the $O_2$ sensor 27 remains between the rich-side allowable limit value VRL and the lean-side allowable limit value VLL for the given waiting time determined by the predetermined number TINL, the target A/F ratio λTG is changed from the stoichiometric A/F ratio "λ=1" to the predetermined rich-side A/F ratio λRT to execute rich-side correction. This process is enabled by the steps S401, S405, and S408 of FIG. 11 and the steps S501 and S503 of FIG. 12. As a result of the change of the target A/F ratio λTG to the predetermined rich-side A/F ratio λRT, greater amounts of CO and HC occur in the exhaust gas and they are absorbed by the catalytic converter 13. In addition, the output voltage VOX2 of the $O_2$ sensor 27 rises and thus indicates the feed of a rich air-fuel mixture to the engine 1. The target A/F ratio λTG is held at the predetermined rich-side A/F ratio λRT for the rich-side correction time determined by the predetermined number TR. This process is enabled by the steps S502 and S503 of FIG. 12. When the rich-side correction time determined by the predetermined number TR terminates, the target A/F ratio λTG is changed from the predetermined rich-side A/F ratio λRT to the predetermined lean-side A/F ratio λLT to execute lean-side correction. This process is enabled by the steps S502 and S506 of FIG. 12. The lean-side correction is designed to compensate for the rich-side correction. As a result of the change of the target A/F ratio λTG to the predetermined lean-side A/F ratio λLT, a greater amount of $O_2$ occurs in the exhaust gas and $O_2$ reacts with CO and HC trapped in the catalytic converter 13. Thus, CO and HC, which has occurred during the previous-mentioned rich-side correction, are removed from the catalytic converter 13. In addition, the output voltage VOX2 of the $O_2$ sensor 27 drops and thus indicates the feed of a nonrich air-fuel mixture to the engine 1. The target A/F ratio λTG is held at the predetermined lean-side A/F ratio λLT for the leaside correction time determined by the predetermined number TL. This process is enabled by the steps S505 and S506 of FIG. 12. When the lean-side correction time determined by the predetermined number TL terminates, the target A/F ratio λTG is returned from the predetermined lean-side A/F ratio λLT to the stoichiometric A/F ratio "λ=1". This process is enabled by the steps S505 and S507 of FIG. 12. It is preferable that the rich-side correction time and the lean-side correction time are equal to each other. In addition, it is preferable that the difference between the predetermined lean-side A/F ratio λLT and the stoichiometric A/F ratio "λ=1" is equal in absolute value to the difference between the predetermined rich-side A/F ratio λRT and the stoichiometric A/F ratio "λ=1".

The program for operating the control unit 31 includes a saturation judgment routine. The saturation judgment routine is reiteratively executed during a certain period each time the distance traveled by the vehicle body increases by 2,000 km. The saturation judgment routine follows the A/F ratio variation control routine of FIG. 12.

Figure 13:
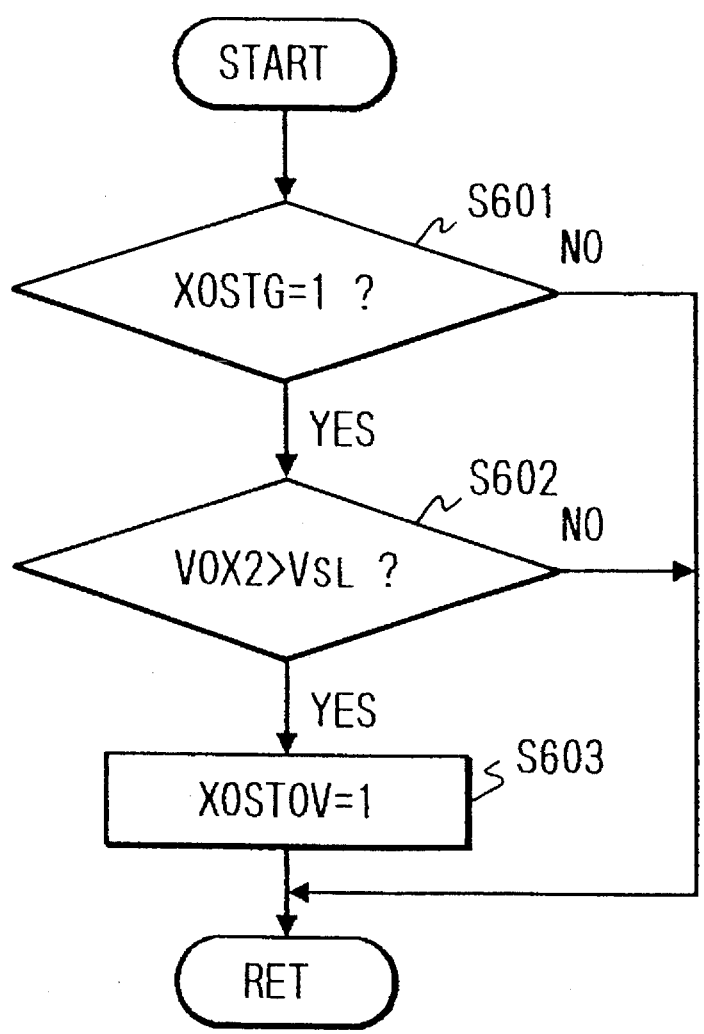
FIG. 13 is a flowchart of a saturation judgment routine in the program for operating the control unit in FIG. 1.

FIG. 13 is a flowchart of the saturation judgment routine. As shown in FIG. 13, a first step S601 of the saturation judgment routine determines whether or not the learning execution flag XOSTG is set. When the learning execution flag XOSTG is determined to be set, the program advances from the step S601 to a step S602. Otherwise, the program exits from the step S601 and the current execution cycle of the saturation judgement routine ends before the program returns to the main routine.

The step S602 determines whether or not the present value VOX2 of the output voltage of the $O_2$ sensor 27 exceeds a predetermined saturation judgment value VSL. The saturation judgment value VSL is greater than the rich-side allowable limit value VRL. When the present value VOX2 of the output voltage of the $O_2$ sensor 27 exceeds the saturation judgment value VSL, the program advances from the step S602 to a step S603. Otherwise, the program exits from the step S602 and the current execution cycle of the saturation judgement routine ends before the program returns to the main routine.

The step S603 sets a saturation judgment flag XOSTOV to "1". Ater the step S603, the current execution cycle of the saturation judgement routine ends and the program returns to the main routine.

The saturation judgment value VSL is chosen to correspond to the output voltage VOX2 of the $O_2$ sensor 27 which occurs under given critical conditions (saturated conditions) where the amount of CO and HC absorbed by the catalytic converter 13 reaches a limit amount and thus CO and HC start to overflow from the catalytic converter 13.

The program for operating the control unit 31 includes a saturation absorbed amount calculation routine. The saturation absorbed amount calculation routine is reiteratively executed during a certain period each time the distance traveled by the vehicle body increases by 2,000 km. The saturation absorbed amount calculation routine follows the A/F ratio variation control routine of FIG. 12.

Figure 14:
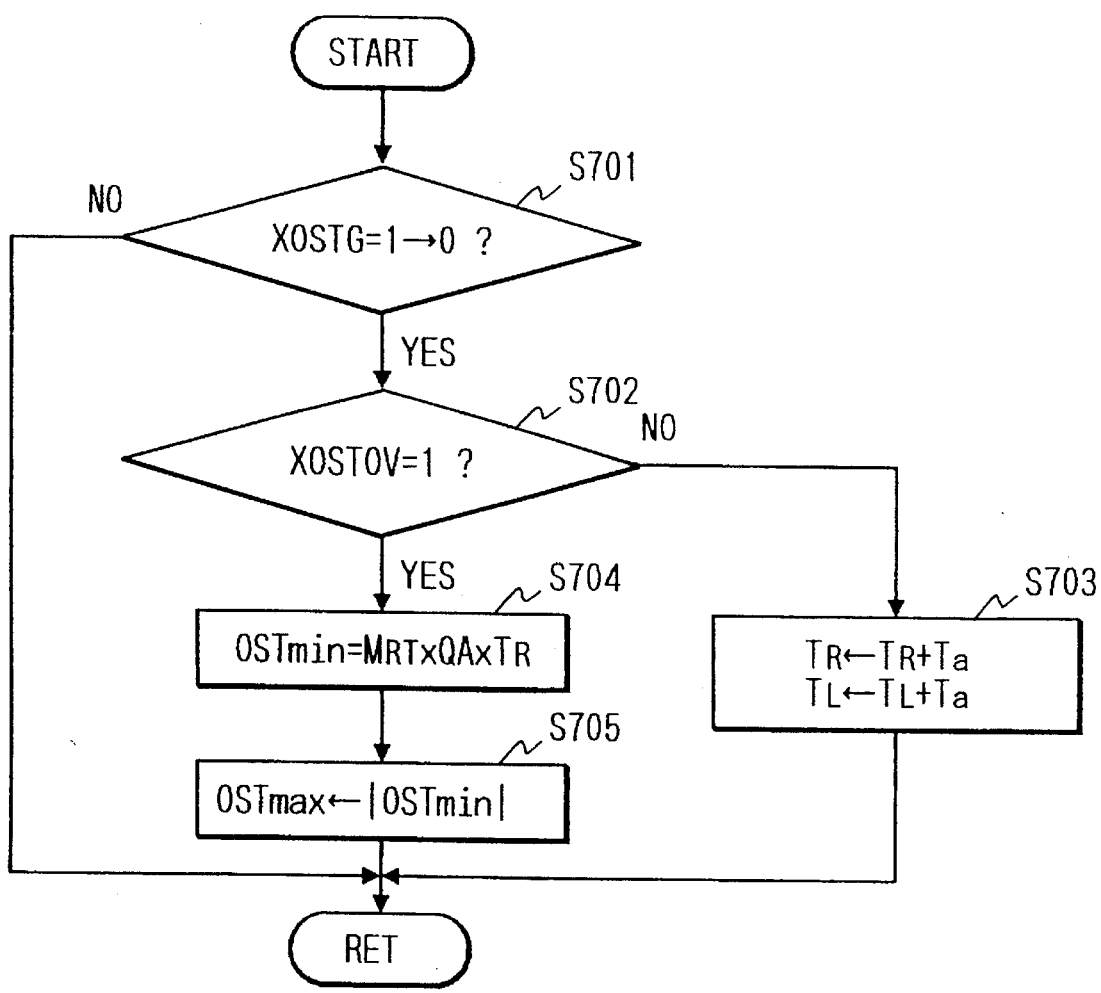
FIG. 14 is a flowchart of a saturation absorbed amount calculation routine in the program for operating the control unit in FIG. 1.

FIG. 14 is a flowchart of the saturation absorbed amount calculation routine. As shown in FIG. 14, a first step S701 of the saturation absorbed amount calculation routine determines whether or not the learning execution flag XOSTG has been cleared to zero by the step S507 of the A/F ratio variation control routine of FIG. 12. When the learning execution flag XOSTG has been cleared to zero, the program advances from the step S701 to a step S702. Otherwise, the program exits from the step S701 and the current execution cycle of the saturation absorbed amount calculation routine ends before the program returns to the main routine.

The step S702 determines whether or not the saturation judgment flag XOSTOV is set. When the saturation judgment flag XOSTOV is determined to be set, the program advances from the step S702 to a step S704. Otherwise, the program advances from the step S702 to a step S703.

The step S703 increments the predetermined number TR by a predetermined number Ta. It should be noted that the predetermined number TR determines the rich-side correction time. In addition, the step S703 increments the predetermined number TL by the predetermined number Ta. It should be noted that the predetermined number TL determines the lean-side correction time. After the step S703, the current execution cycle of the saturation absorbed amount calculation routine ends and the program returns to tile main routine.

The step S704 calculates the minimum absorbed amount OSTmin which corresponds to the current amount of CO and HC absorbed by the catalytic converter 13. Specifically, the calculation of the minimum absorbed mount OSTmin is executed by referring to the equation as "OSTmin=MRT× QA×TR" where MRT denotes a specific-component concentration in the exhaust gas which is determined according to the relation of FIG. 10. The specific-component concentration which occurs at the predetermined rich-side A/F ratio λRT is used as the specific-component concentration MRT in the equation for calculating the minimum absorbed mount OSTmin. Since the specific-component concentration MRT is negative, the minimum absorbed amount OSTmin is also negative.

A step S705 following the step S704 sets the maximum absorbed mount OSTmax equal to the absolute value of the minimum absorbed mount OSTmin. After the step S705, the current execution cycle of the saturation absorbed amount calculation routine ends and the program returns to the main routine.

The calculated minimum absorbed amount OSTmin is used by the step S309 of the saturation skip control routine of FIG. 7. In addition, the calculated maximum absorbed amount OSTmax is used by the step S318 of the saturation skip control routine of FIG. 8.

As previously described with reference to FIG. 15, in the case where the present value VOX2 of the output voltage of the $O_2$ sensor 27 remains between the rich-side allowable limit value VRL and the lean-side allowable limit value VLL for the given waiting tinhe determined by the predetermined number TINL, the rich-side correction and the lean-side correction are sequentially executed during the periods determined by the predetermined numbers TR and TL respectively. As a result of the rich-side correction, the output voltage VOX2 of the $O_2$ sensor 27 rises and thus indicates the feed of a rich air-fuel mixture to the engine 1. When the output voltage VOX2 of the $O_2$ sensor 27 does not reach the predetermined saturation judgment level VSL, second rich-side correction and second lean-side correction are sequentially executed during extended periods as described hereinafter.

As shown in FIG. 15, during a period after the first lean-side correction time determined by the predetermined number TL, when the present value VOX2 of the output voltage of the $O_2$ sensor 27 remains between the rich-side allowable limit value VRL and the lean-side allowable limit value VLL for the learning interval T, the target A/F ratio $\lambda$TG is changed from the stoichiometric A/F ratio "$\lambda$=1" to the predetermined rich-side A/F ratio $\lambda$RT to execute second rich-side correction. This process is enabled by the steps S401 and S407 of FIG. 11 and the steps S501 and S503 of FIG. 12. As a result of the change of the target A/F ratio $\lambda$TG to the predetermined rich-side A/F ratio $\lambda$RT, greater amounts of CO and HC occur in the exhaust gas and they are absorbed by the catalytic converter 13. In addition, the output voltage VOX2 of the $O_2$ sensor 27 rises and thus indicates the feed of a rich air-fuel mixture to the engine 1. The target A/F ratio $\lambda$TG is held at the predetermined rich-side A/F ratio $\lambda$RT for the extended rich-side correction time determined by the sum of the original predetermined number TR and the predetermined number Ta. This process is enabled by the steps S502 and S503 of FIG. 12. It should be noted that the sum of the original predetermined number TR and the predetermined number Ta is given by the step S703 of FIG. 14. When the extended rich-side correction time determined by the sum of the original predetermined number TR and the predetermined number Ta terminates, the target A/F ratio $\lambda$TG is changed from the predetermined rich-side A/F ratio $\lambda$RT to the predetermined lean-side A/F ratio $\lambda$LT to execute second lean-side correction. This process is enabled by the steps S502 and S506 of FIG. 12. The second lean-side correction is designed to compensate for the second rich-side correction. As a result of the change of the target A/F ratio $\lambda$TG to the predetermined lean-side A/F ratio $\lambda$LT, a greater mount of $O_2$ occurs in the exhaust gas and $O_2$ reacts with CO and HC trapped in the catalytic converter 13. Thus, CO and HC, which has occurred during the previous-mentioned rich-side correction, are removed from the catalytic converter 13. In addition, the output voltage VOX2 of the $O_2$ sensor 27 drops and thus indicates the feed of a nonrich air-fuel mixture to the engine 1. The target A/F ratio $\lambda$TG is held at the predetermined lean-side A/F ratio $\lambda$LT for the extended lean-side correction time determined by the sum of the original predetermined number TL and the predetermined number Ta. This process is enabled by the steps S505 and S506 of FIG. 12. It should be noted that the sum of the original predetermined number TL and the predetermined number Ta is given by the step S703 of FIG. 14. When the extended lean-side correction time determined by the predetermined number TL terminates, the target A/F ratio $\lambda$TG is returned from the predetermined lean-side A/F ratio $\lambda$LT to the stoichiometric A/F ratio "$\lambda$=1". This process is enabled by the steps S505 and S507 of FIG. 12. It is preferable that the extended rich-side correction time and the extended lean-side correction time are equal to each other.

As a result of the second rich-side correction, the output voltage VOX2 of the $O_2$ sensor 27 rises and thus indicates the feed of a rich air-fuel mixture to the engine 1. When the output voltage VOX2 of the $O_2$ sensor 27 does not reach the predetermined saturation judgment level VSL, third rich-side correction and third lean-side correction are sequentially executed during further extended periods. Until the output voltage VOX2 of the $O_2$ sensor 27 reaches the predetermined saturation judgment level VSL, later rich-side and lean-side corrections are iteratively executed during further extended periods. When the output voltage VOX2 of the $O_2$ sensor 27 exceeds the predetermined saturation judgment level VSL, that is, when the catalytic converter 13 is saturated in a rich side, the program advances from the step S602 to the step S603 in the saturation judgment routine of FIG. 13 so that the saturation judgment flag XOSTOV is set to "1" by the step S603. As a result of the change of the saturation judgment flag XOSTOV to "1", the program advances from the step S702 to the step S704. The step S704 calculates the minimum absorbed amount OSTmin which corresponds to the current amount of CO auld HC absorbed by the catalytic converter 13. Then, the step S705 sets the maximum absorbed amount OSTmax equal to the absolute value of the minimum absorbed amount OSTmin. The calculated minimum absorbed amount OSTmin is used by the step S309 of the saturation skip control routine of FIG. 7. In addition, the calculated maximum absorbed amount OSTmax is used by the step S318 of the saturation skip control routine of FIG. 8.

As previously described, the minimum absorbed amount OSTmin and the maximum absorbed amount OSTmax are calculated by the learning process. The minimum absorbed amount OSTmin and the maximum absorbed amount OSTmax are numerical or quantitative information representing the saturation conditions of the catalytic converter 13. The minimum absorbed amount OSTmin and the maximum absorbed amount OSTmax are used in determining the correction period values TFL and TFR. Since the minimum absorbed amount OSTmin and the maximum absorbed amount OSTmax are numerical or quantitative information, the correction period values TFL and TFR can be suitable and reliable.

As previously described, the minimum absorbed amount OSTmin and the maximum absorbed amount OSTmax are calculated under conditions where the catalytic converter 13 is actually saturated by setting the target A/F ratio $\lambda$TG to the predetermined rich-side value. Thus, the minimum absorbed amount OSTmin and the maximum absorbed amount OSTmax accurately indicate the conditions of deterioration of the catalytic converter 13.

The embodiment of this invention may be modified as follows. In a first modification, the target A/F ratio $\lambda$TG is periodically varied to execute dither control. In a second modification, the target A/F ratio $\lambda$TG is changed to a lean-side value and a maximum absorbed mount OSTmax is calculated, and then a minimum absorbed amount OSTmin is determined by the absolute value of the maximum absorbed amount OSTmax. In a third modification, the target A/F ratio $\lambda$TG is changed to a rich-side value and a minimum absorbed mount OSTmin is calculated, and then the target A/F ratio $\lambda TG$ is changed to a lean-side value and a maximum absorbed amount OSTmax is calculated. A fourth modification executes open-loop control of the A/F ratio instead of closed-loop (feedback) control thereof in predetermined operating conditions of the engine 1. In the fourth modification, during the execution of the open-loop control, the rich-side correction and the lean-side correction to obtain the minimum and maximum absorbed amounts OSTmtn and OSTmax are performed by varying the fuel injection rate. In a fifth modification, the rich-side correction time remains fixed and the rich-side A/F ratio $\lambda RT$ is incremented stepwise as the rich-side correction to obtain the minimum and maximum absorbed mounts OSTmin and OSTmax is repeated. In a sixth modification, the rich-side correction time and the rich-side A/F ratio $\lambda RT$ are periodically increased as the rich-side correction to obtain the minimum and maximum absorbed mounts OSTmin and OSTmax is repeated. In a seventh modification, under conditions where the engine speed Ne and the intake air pressure PM are essentially constant, the product of the predetermined number TR (the rich-side correction time) and the specific-component concentration ML is regarded as the minimum absorbed mount OSTmin. In an eighth modification, since the specific-component concentration ML is determined by the A/F ratio $\lambda$ as shown in FIG. 10, the product of the predetermined number TR (the rich-side correction time) and the A/F ratio $\lambda$ is regarded as the minimum absorbed mount OSTmin.

Second Embodiment

A second embodiment of this invention is similar to the embodiment of FIGS. 1–15 except for design changes indicated hereinafter. In the second embodiment, a program block S103 (see FIG. 3) for setting a target A/F ratio $\lambda TG$ includes a central value setting routine and a dither control routine. The central value setting routine is designed to set a central value $\lambda TGC$ of the target A/F ratio $\lambda TG$ in response to the output voltage VOX2 of an $O_2$ sensor 27 (see FIG. 1). The dither control routine is designed to vibrate the target A/F ratio $\lambda TG$ around the central value $\lambda TGC$ at a short period and with a small amplitude. The dither control routine may be of one of known types. When a related program advances to the block S103 (see FIG. 3), the central value setting routine and the dither control routine are executed.

Figure 16:
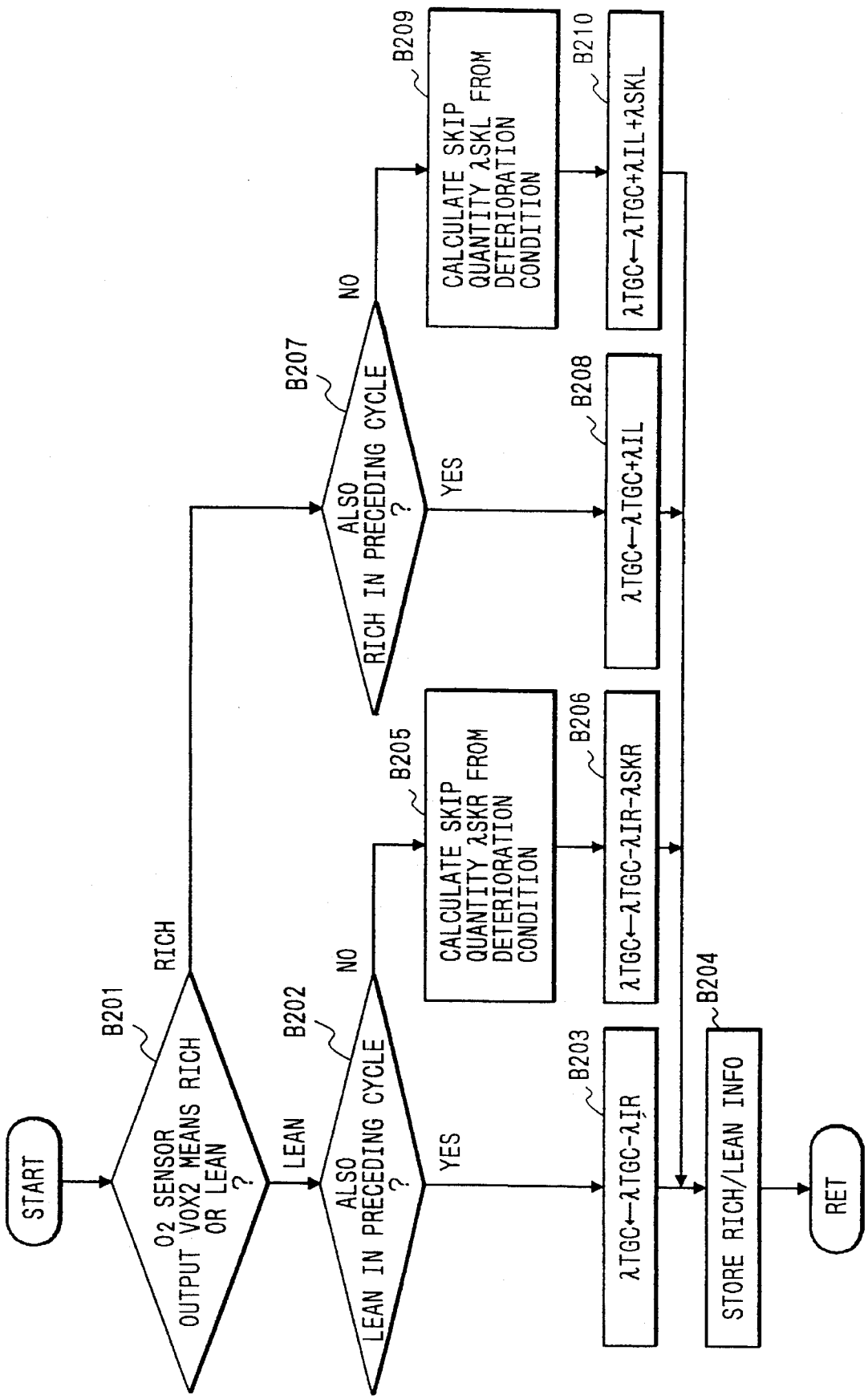
FIG. 16 is a flowchart of a central value setting routine in a program for operating a control unit according to a second embodiment of this invention.

FIG. 16 is a flowchart of the central value setting routine in the block S103 (see FIG. 3). Generally, the central value setting routine is reiterated at a given period. As shown in FIG. 16, the central value setting routine includes a first step B201 which generally follows a step S102 (see FIG. 3). The step B201 compares the output voltage VOX2 of the $O_2$ sensor 27 (see FIG. 1) with a predetermined reference voltage, for example, 0.45 V, which corresponds to the stoichiometric A/F ratio "$\lambda=1$" In other words, the step B201 determines whether the detected A/F ratio $\lambda$ represented by the output voltage VOX2 of the $O_2$ sensor 27 (see FIG. 1) is in a lean side or a rich side. When the output voltage VOX2 of the $O_2$ sensor 27 (see FIG. 1) is equal to or lower than the reference voltage, that is, when the A/F ratio $\lambda$ is in the lean side, the program advances from the step B201 to a step B202. When the output voltage VOX2 of the $O_2$ sensor 27 (see FIG. 1) is higher than the reference voltage, that is, when the A/F ratio $\lambda$ is in the rich side, the program advances from the step B201 to a step B207.

The step B202 determines whether or not the detected A/F ratio $\lambda$ represented by the output voltage VOX2 of the $O_2$ sensor 27 (see FIG. 1) was in the lean side also during the preceding execution cycle of the program, that is, whether or not the A/F ratio $\lambda$ remains in the lean side. When the A/F ratio $\lambda$ remains in the lean side, the program advances from the step B202 to a step B203. When the A/F ratio $\lambda$ does not remain in the lean side, or when the A/F ratio $\lambda$ changes from the rich side to the lean side, the program advances from the step B202 to a step B205.

Figure 17:
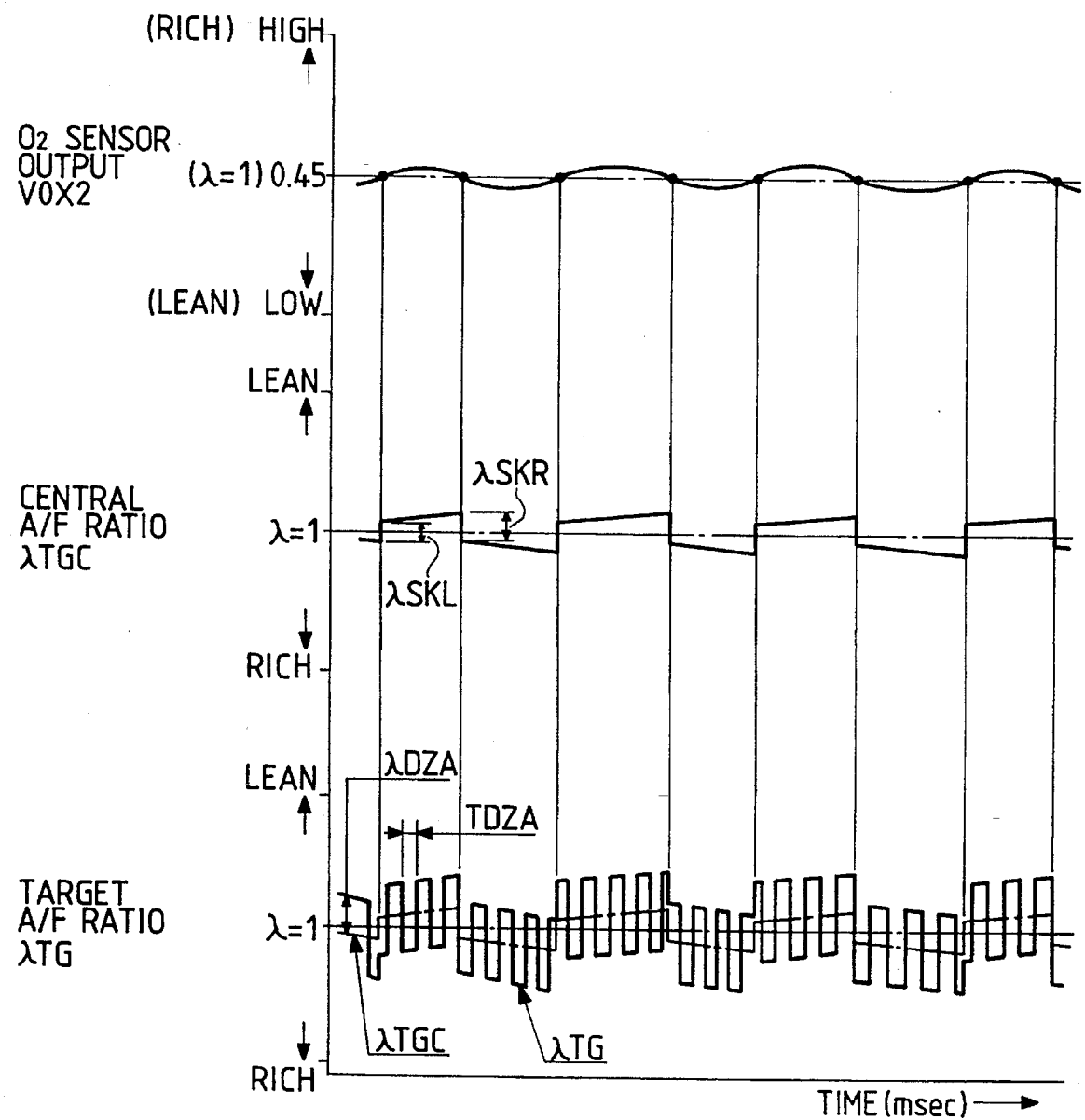
FIG. 17 is a time-domain diagram of the output voltage of an $O_2$ sensor, a central value λTGC of an A/F ratio, and a target A/F ratio λTG in the second embodiment.

The step B203 decrements the central value $\lambda TGC$ by a predetermined value $\lambda IR$ according to the statement "$\lambda TGC=TGC-\lambda IR$". Thus, the central value $\lambda TGC$ is corrected toward a richer side. The predetermined value $\lambda IR$ is chosen to provide a small rich-side integral quantity. Therefore, as shown in FIG. 17, the central value $\lambda TGC$ is slightly decreased in the rich side. After the step B203, the program advances to a step B204.

Figure 18:
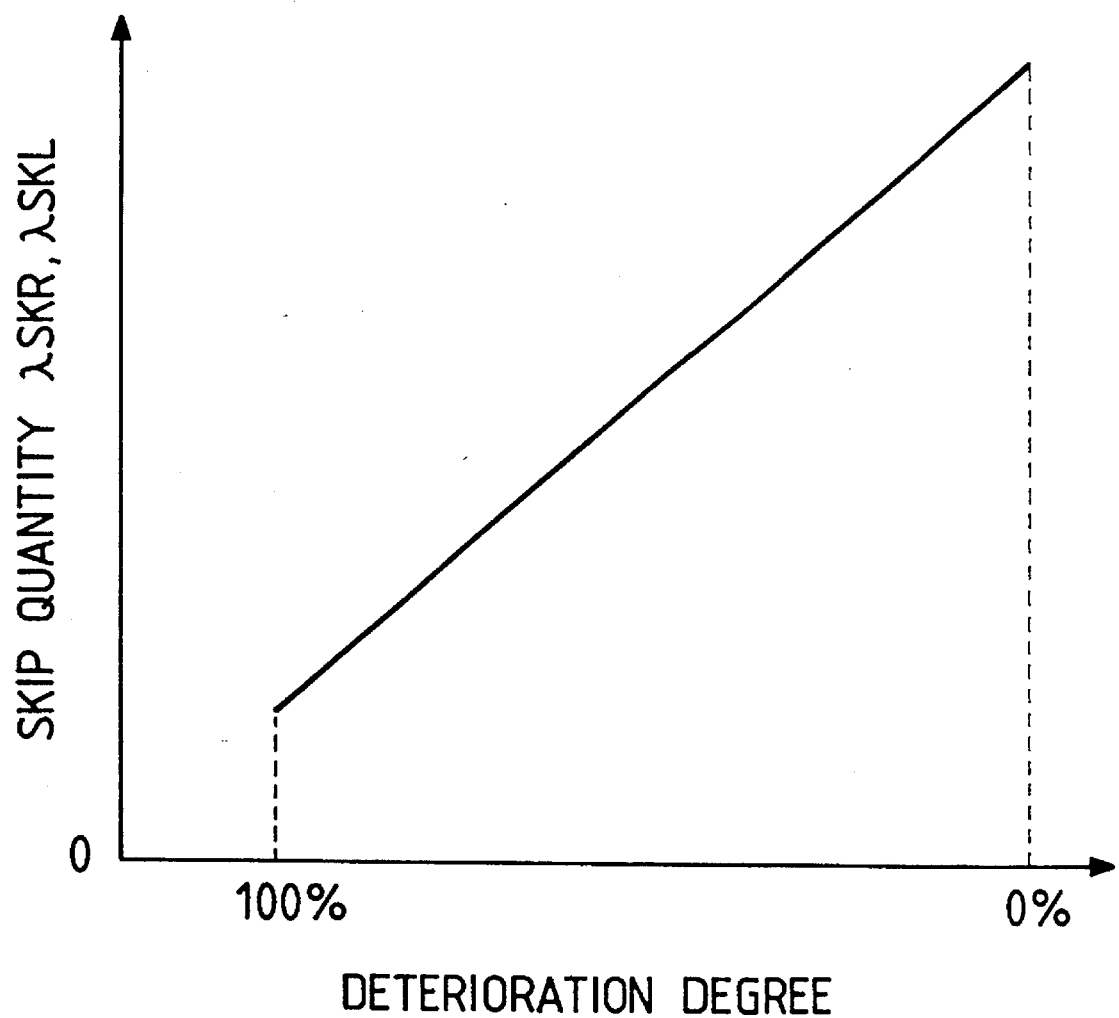
FIG. 18 is a diagram of the relation between a degree of deterioration of a catalytic converter and a rich skip quantity λSKR or a lean skip quantity λSKL in the second embodiment.

The step B205 calculates a rich skip quantity $\lambda SKR$ from a degree of deterioration of a three-way catalytic converter 13 (see FIG. 1) by referring to a predetermined map or table stored in a ROM 33 (see FIG. 1). The map in the ROM 33 (see FIG. 1) provides a relation between the rich skip quantity $\lambda SKR$ and the degree of deterioration of the catalytic converter 13 (see FIG. 1). This relation is designed so that, as shown in FIG. 18, the rich skip quantity $\lambda SKR$ decreases linearly with an increase in the degree of deterioration of the catalytic converter 13 (see FIG. 1) from 0% to 100%. In addition, the minimum value of the rich skip quantity $\lambda SKR$ is sufficiently greater than the rich-side integral value $\lambda IR$. It should be noted that the degree of deterioration of the catalytic converter 13 (see FIG. 1) is determined by a deterioration degree detecting routine described later.

A step B206 following the step B205 decrements the central value $\lambda TGC$ by the sum of the predetermined value $\lambda IR$ and the rich skip quantity $\lambda SKR$ according to the statement "$\lambda TGC=\lambda TGC-\lambda IR-\lambda SKR$". Thus, the central value $\lambda TGC$ is reduced stepwise by approximately the rich skip quantity $\lambda SKR$, and is changed from the lean side to the rich side as shown in FIG. 17. After the step B206, the program advances to the step B204.

The step B207 determines whether or not the detected A/F ratio $\lambda$ represented by the output voltage VOX2 of the $O_2$ sensor 27 (see FIG. 1) was in the rich side also during the preceding execution cycle of the program, that is, whether or not the A/F ratio $\lambda$ remains in the rich side. When the A/F ratio $\lambda$ remains in the rich side, the program advances from the step B207 to a step B208. When the A/F ratio $\lambda$ does not remain in the rich side, or when the A/F ratio $\lambda$ changes from the lean side to the rich side, the program advances from the step B207 to a step B209.

The step B208 increments the central value $\lambda TGC$ by a predetermined value $\lambda IL$ according to the statement "$\lambda TGC=\lambda TGC+\lambda IL$". Thus, the central value $\lambda TGC$ is corrected toward a leaner side. The predetermined value $\lambda IL$ is chosen to provide a small lean-side integral quantity. Therefore, as shown in FIG. 17, the central value $\lambda TGC$ is slightly increased in the lean side. After the step B208, the program advances to the step B204.

The step B209 calculates a lean skip quantity $\lambda SKL$ from the degree of deterioration of the catalytic converter 13 (see FIG. 1) by referring to a predetermined map or table stored in the ROM 33 (see FIG. 1). The map in the ROM 33 (see FIG. 1) provides a relation between the lean skip quantity $\lambda SKL$ and the degree of deterioration of the catalytic converter 13 (see FIG. 1). This relation is designed so that, as shown in FIG. 18, the lean skip quantity $\lambda SKL$ decreases linearly with an increase in the degree of deterioration of the catalytic converter 13 (see FIG. 1) from 0% to 100%. In addition, the minimum value of the lean skip quantity $\lambda SKL$ is sufficiently greater than the lean-side integral value $\lambda IL$.

It should be noted that the degree of deterioration of the catalytic converter 13 (see FIG. 1) is determined by the deterioration degree detecting routine described later.

A step B210 following the step B209 increments the central value $\lambda$TGC by the sum of the predetermined value $\lambda$IL and the lean skip quantity $\lambda$SKL according to the statement "$\lambda$TGC=$\lambda$TGC+$\lambda$IL+$\lambda$SKL". Thus, the central value $\lambda$TGC is increased stepwise by approximately the lean skip quantity $\lambda$SKL, and is changed from the rich side to the lean side as shown in FIG. 17. After the step B210, the program advances to the step B204.

The step B204 stores a rich/lean signal into a RAM 34 (see FIG. 1). The rich/lean signal represents whether the currently detected A/F ratio $\lambda$ is in the rich side or the lean side. In other words, the rich/lean signal indicates the polarity of the currently detected A/F ratio $\lambda$. The rich/lean signal is generated by the previous step B201. After the step B204, the current execution cycle of the central value setting routine ends and the program returns to a main routine.

The central value setting routine of FIG. 16 provides the following processes. In the case where the detected A/F ratio $\lambda$ represented by the output voltage VOX2 of the $O_2$ sensor 27 (see FIG. 1) remains in the lean side, the step B203 gradually decreases the central value $\lambda$TGC toward a richer side at a rate determined by the rich-side integral value $\lambda$IR. In the case where the detected A/F ratio $\lambda$ represented by the output voltage VOX2 of the $O_2$ sensor 27 (see FIG. 1) remains in the rich side, the step B208 gradually increases the central value $\lambda$TGC toward a leaner side at a rate determined by the lean-side integral value $\lambda$IL. When the detected A/F ratio $\lambda$ represented by the output voltage VOX2 of the $O_2$ sensor 27 (see FIG. 1) changes from the rich side to the lean side, the step B206 changes stepwise the central value $\lambda$TGC from the lean side to the rich side by approximately the rich skip quantity $\lambda$SKR. When the detected A/F ratio $\lambda$ represented by the output voltage VOX2 of the $O_2$ sensor 27 (see FIG. 1) changes from the lean side to the rich side, the step B210 changes stepwise the central value $\lambda$TGC from the rich side to the lean side by approximately the lean skip quantity $\lambda$SKL. As previously described, the rich skip quantity $\lambda$SKR and the lean skip quantity $\lambda$SKL depend on the degree of deterioration of the catalytic converter 13 (see FIG. 1).

Figure 19:
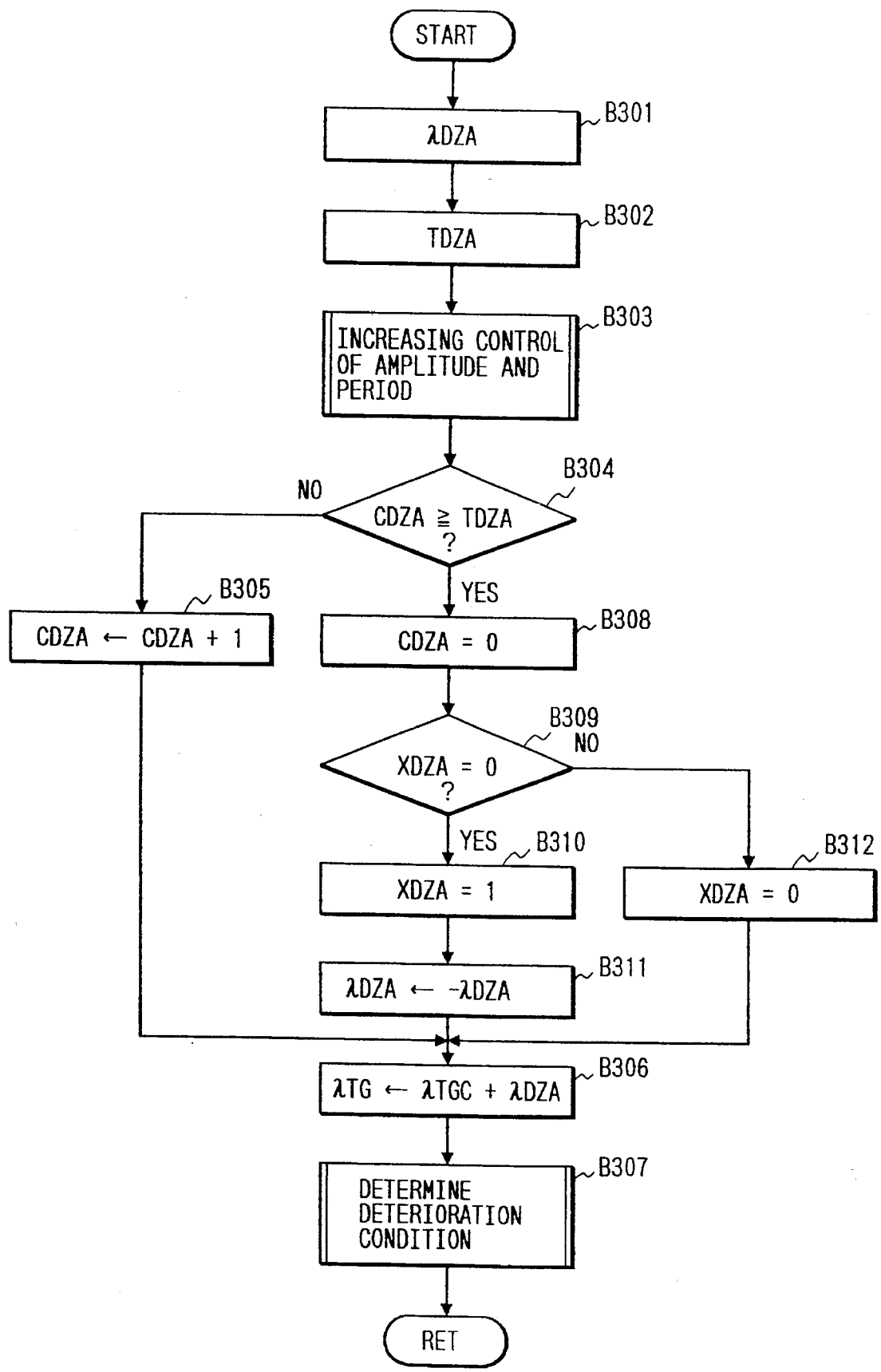
FIG. 19 is a flowchart of a dither control routine in the program for operating the control unit in the second embodiment.

FIG. 19 is a flowchart of the dither control routine in the block S103 (see FIG. 3). Generally, the dither control routine is reiterated at a given period. As shown in FIG. 19, a first step B301 of the dither control routine sets a dither amplitude $\lambda$DZA in a known way. A step B3O2 following the step B301 sets a dither period TDZA in a known way. Specifically, the dither amplitude $\lambda$DZA and the dither period TDZA are determined in response to a current engine speed Ne and a current intake air pressure PM derived from the output signals of a rotational speed sensor 25 (see FIG. 1) and a pressure sensor 22 (see FIG. 1 ).

A block B303 following the step B302 controls the dither amplitude $\lambda$DZA and the dither period TDZA as will be described later. After the block B303, the program advances to a step B304.

The step B304 determines whether or not a value CDZA indicating a dither period counter is smaller than the dither period TDZA. When the dither period counter value CDZA is smaller than the dither period TDZA, the program advances from the step B304 to a step B305. When the dither period counter value CDZA is equal to or greater than the dither period TDZA, the program advances from the step B304 to a step B308.

The step B305 increments the dither period counter value CDZA by "1" according to the statement "CDZA=CDZA +1". After the step B305, the program advances to a step B306.

The step B308 resets the dither period counter value CDZA to "0". After the step B308, the program advances to a step B309.

The step B309 determines whether or not a flag XDZA is equal to "0". The flag XDZA indicates a direction of dither control. The flag XDZA being "1" represents that the current target A/F ratio $\lambda$TG is set in a rich side of the central value $\lambda$TGC. The flag XDZA being "0" represents that the current target A/F ratio $\lambda$TG is set in a lean side of the central value $\lambda$TGC. When the dither control direction flag XDZA is determined to be "0", the program advances from the step B309 to a step B310. When the dither control direction flag XDZA is determined to be not "0", the program advances from the step B309 to a step B312.

The step B310 sets the dither control direction flag XDZA to "1". A step B311 following the step B310 inverts the dither amplitude $\lambda$DZA into a corresponding negative value or a corresponding opposite-sign value by referring to the statement "$\lambda$DZA=−$\lambda$DZA". After the step B311, the program advances to the step B306.

The step B312 resets the dither control direction flag XDZA to "0". After the step B312, the program advances to the step B306.

The step B306 sets the target A/F ratio $\lambda$TG to the sum or addition of the central value $\lambda$TGC and the dither amplitude $\lambda$DZA by referring to the statement "$\lambda$TG=$\lambda$TGC+$\lambda$DZA". As will be described later, the sign (polarity) of the dither amplitude $\lambda$DZA is periodically changed between "positive" and "negative". When the sign (polarity) of the dither amplitude $\lambda$DZA is positive, the target A/F ratio $\lambda$TG is set in a rich side of the central value $\lambda$TGC by the dither amplitude $\lambda$DZA. When the sign (polarity) of the dither amplitude $\lambda$DZA is negative, the target A/F ratio $\lambda$TG is set in a lean side of the central value $\lambda$TGC by the dither amplitude $\lambda$DZA.

A block B307 following the step B306 includes a routine for detecting the degree of deterioration of the catalytic converter 13 (see FIG. 1). The deterioration degree detecting routine will be described later. After the block B307, the current execution cycle of the dither control routine ends and the program returns to the main routine.

The dither control routine of FIG. 19 provides the following processes. As shown in FIG. 17, the target A/F ratio $\lambda$TG changes by the dither amplitude $\lambda$DZA around the central value $\lambda$TGC and alternates between a rich side and a lean side each time the dither period TDZA elapses. The target A/F ratio $\lambda$TG determined in the dither control routine is used by a step S104 of FIG. 3 for calculating an A/F ratio corrective coefficient FAF. A step S105 of FIG. 3 determines a target fuel injection rate TAU in response to parameters including the A/F ratio corrective coefficient FAF. As a result, the A/F ratio of an air-fuel mixture varies or vibrates at a short period and a small amplitude corresponding to the dither period TDZA and the dither amplitude $\lambda$DZA respectively.

As understood from the previous description, substantial control of the A/F ratio of an air-fuel mixture is executed by the central value setting routine of FIG. 16. According to the central value setting routine, the central value $\lambda$TGC is controlled in response to the rich-side integral value $\lambda$IR, the lean-side integral value $\lambda$IL, the rich skip quantity $\lambda$SKR, and the lean skip quantity $\lambda$SKL to cancel the deviation of the detected A/F ratio $\lambda$ from the stoichiometric A/F ratio "$\lambda$=1". Therefore, the detected A/F ratio $\lambda$ is substantially maintained at the stoichiometric A/F ratio "$\lambda$=1" during a normal mode of operation of a control unit 31 (see FIG. 1) other than a deterioration degree detecting mode which will be described later. As previously described, stepwise changes of the central value λTGC in response to the rich skip quantity λSKR and the lean skip quantity λSKL are provided each time the detected A/F ratio λ represented by the output voltage VOX2 of the $O_2$ sensor 27 (see FIG. 1) changes between the rich side and the lean side. Such stepwise changes of the central value λTGC can promptly suppress a disturbance of the A/F ratio of an air-fuel mixture. Thus, as shown in FIG. 17, the output voltage VOX2 of the $O_2$ sensor 27 (see FIG. 1) is substantially maintained at 0.45 V which corresponds to the stoichiometric A/F ratio "λ=1".

As previously described, the target A/F ratio λTG is controlled by the dither control routine of FIG. 19. Since the dither period TDZA is remarkably shorter than the period of stepwise changes of the central value λTGC in response to the rich skip quantity λSKR and the lean skip quantity λSKL as shown in FIG. 17, only a very small mount of CO and HC or $NO_x$ occurs during one dither period TDZA for which the A/F ratio of an air-fuel mixture is in a rich or lean side. Therefore, during the normal mode of operation of the control unit 31 (see FIG. 1) other than the deterioration degree detecting mode, the catalytic converter 13 (see FIG. 1) is not saturated by the dither control, and the detected A/F ratio λ derived from exhaust gas at a downstream of the catalytic converter 13 (see FIG. 1) is substantially independent of the dither control as shown in FIG. 17.

As a result of the control of the target A/F ratio λTG by the dither control routine of FIG. 19, the A/F ratio of an air-fuel mixture varies or vibrates at a small amplitude and a short period. It is confirmed that such periodical variation of the A/F ratio of an air-fuel mixture enlarges the window of the catalytic converter 13 (see FIG. 1). Thus, the dither control increases the performance of the the catalytic converter 13 (sec FIG. 1).

Figure 20:
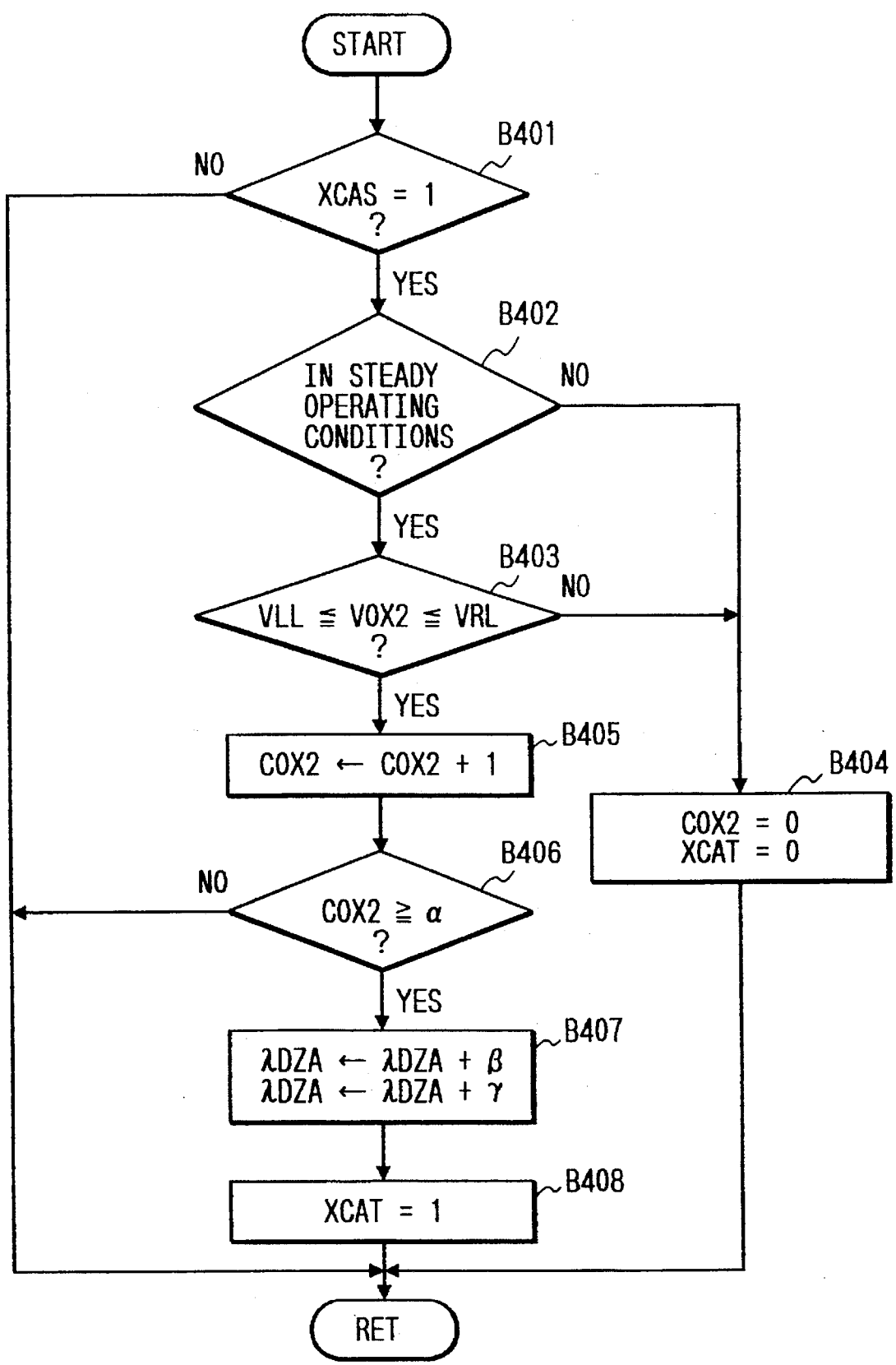
FIG. 20 is a flowchart of an amplitude and period control routine in the program for operating the control unit in the second embodiment.

The block B303 in FIG. 19 includes a routine for controlling the dither amplitude λDZA and the dither period TDZA. Generally, the amplitude and period control routine is reiterated at a given period. As shown in FIG. 20, the amplitude and period control routine includes a first step B401 which generally follows the step B302 of FIG. 19. The step B401 determines whether or not a deterioration detection executing flag XCAS is "1". When the deterioration detection executing flag XCAS is "1", the program advances from the step B401 to a step B402. Otherwise, the current execution cycle of the amplitude and period control routine ends and the program returns to the main routine.

The program for operating the control unit 31 (see FIG. 1) includes a subroutine for setting the deterioration detection executing flag XCAS to "1" each time the distance traveled by a related vehicle body increases by 2,000 km.

The step B402 determines whether or not an engine 1 (see FIG. 1) is in given steady operating conditions by referring to, for example, histories of the engine speed Ne and the intake air pressure PM. When the engine 1 (see FIG. 1) is in the given steady operating conditions, the program advances from the step B402 to a step B403. Otherwise, the program advances from the step B402 to a step B404.

The step B403 determines whether or not the present value VOX2 of the output voltage of the $O_2$ sensor 27 (see FIG. 1) exists between a predetermined rich-side allowable limit value VRL and a predetermined lean-side allowable limit value VLL. When the present value VOX2 of the output voltage of the $O_2$ sensor 27 (see FIG. 1) exists between the rich-side allowable limit value VRL and the lean-side allowable limit value VLL, the program advances from the step B403 to a step B405. Otherwise, the program advances from the step B403 to the step B404.

The step B404 resets a value COX2 and a control completion flag XCAT to "0". The value COX2 indicates a waiting time counter. After the step B404, the current execution cycle of the amplitude and period control routine ends and the program returns to the main routine.

The step B405 increments the waiting time counter value COX2 by "1" according to the statement "COX2=COX2+1". After the step B405, the program advances to a step B406.

The step B406 compares the waiting time counter value COX2 with a predetermined value "α" corresponding to a preset waiting time. When the waiting time counter value COX2 is equal to or greater than the predetermined value "α", the program advances from the step B406 to a step B407. Otherwise, the current execution cycle of the amplitude and period control routine ends and the program returns to the main routine.

The step B407 adds a deterioration detection corrective value "β" to the dither amplitude λDZA determined by the step B301 in FIG. 19. Specifically, the step B407 increments the dither amplitude λDZA by referring to the statement "λDZA=λDZA+β". In addition, the step B407 adds a deterioration detection corrective value "γ" to the dither period TDZA determined by the step B302 in FIG. 19. Specifically, the step B407 increments the dither period TDZA by referring to the statement "TDZA=TDZA+γ".

A step B408 following the step B407 sets the control completion flag XCAT to "1". After the step B408, the current execution cycle of the amplitude and period control routine ends and the program returns to the main routine.

Figure 22:
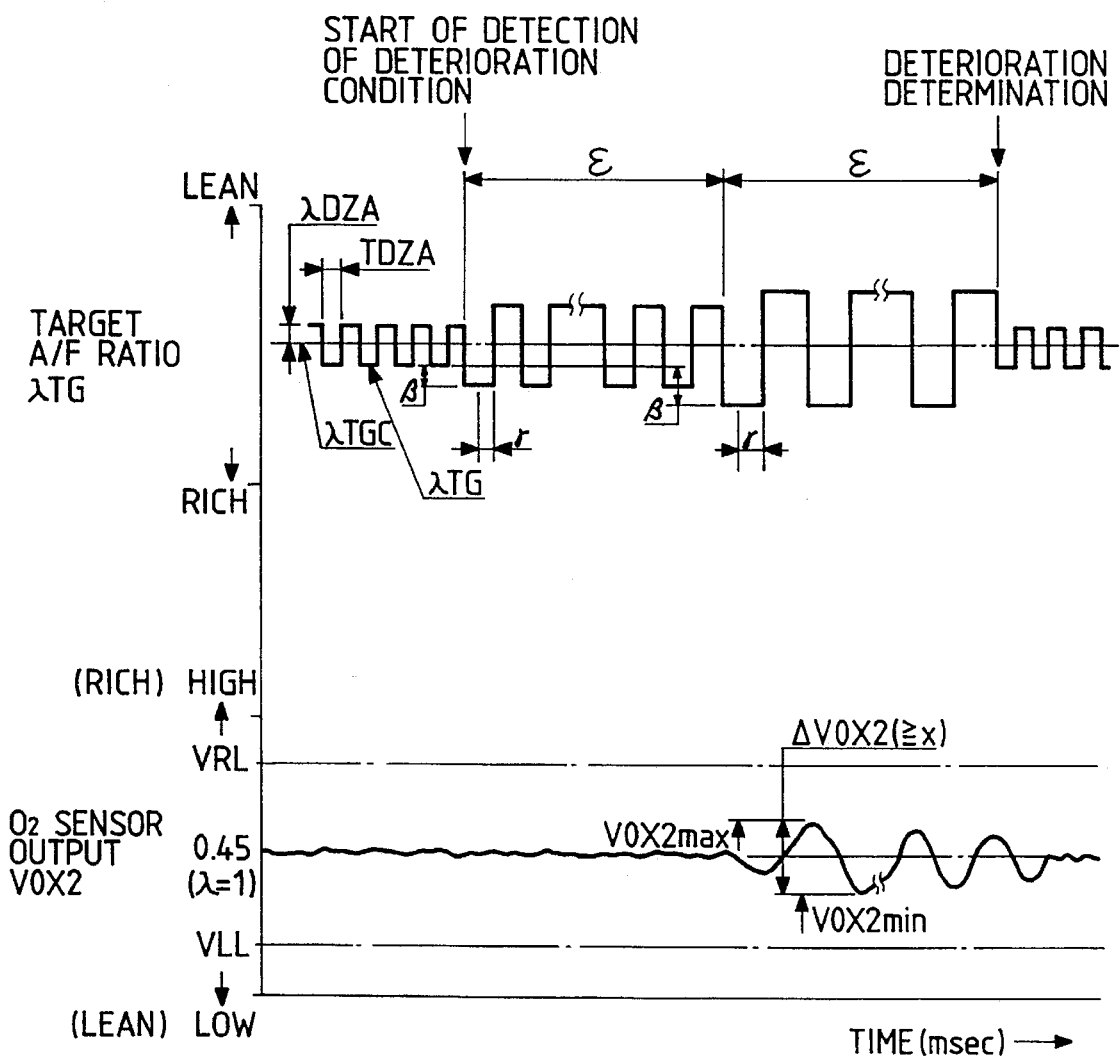
FIG. 22 is a time-domain diagram of the output voltage of the O₂ sensor and the target A/F ratio λTG in the second embodiment.

As understood from the previous description, the dither amplitude λDZA and the dither period TDZA are correctively increased by the step B407. The correctively-increased amplitude λDZA and period TDZA are used in the dither control routine of FIG. 19, so that the target A/F ratio λTG varies or vibrates at a greater amplitude and a longer period than normal as shown in FIG. 22. In addition, the A/F ratio of an air-fuel mixture varies or vibrates at a greater amplitude and a longer period. It should be noted that, in FIG. 22, the central value λTGC is illustrated as being constant for an easier understanding of the dither control of the target A/F ratio λTG.

Figure 21:
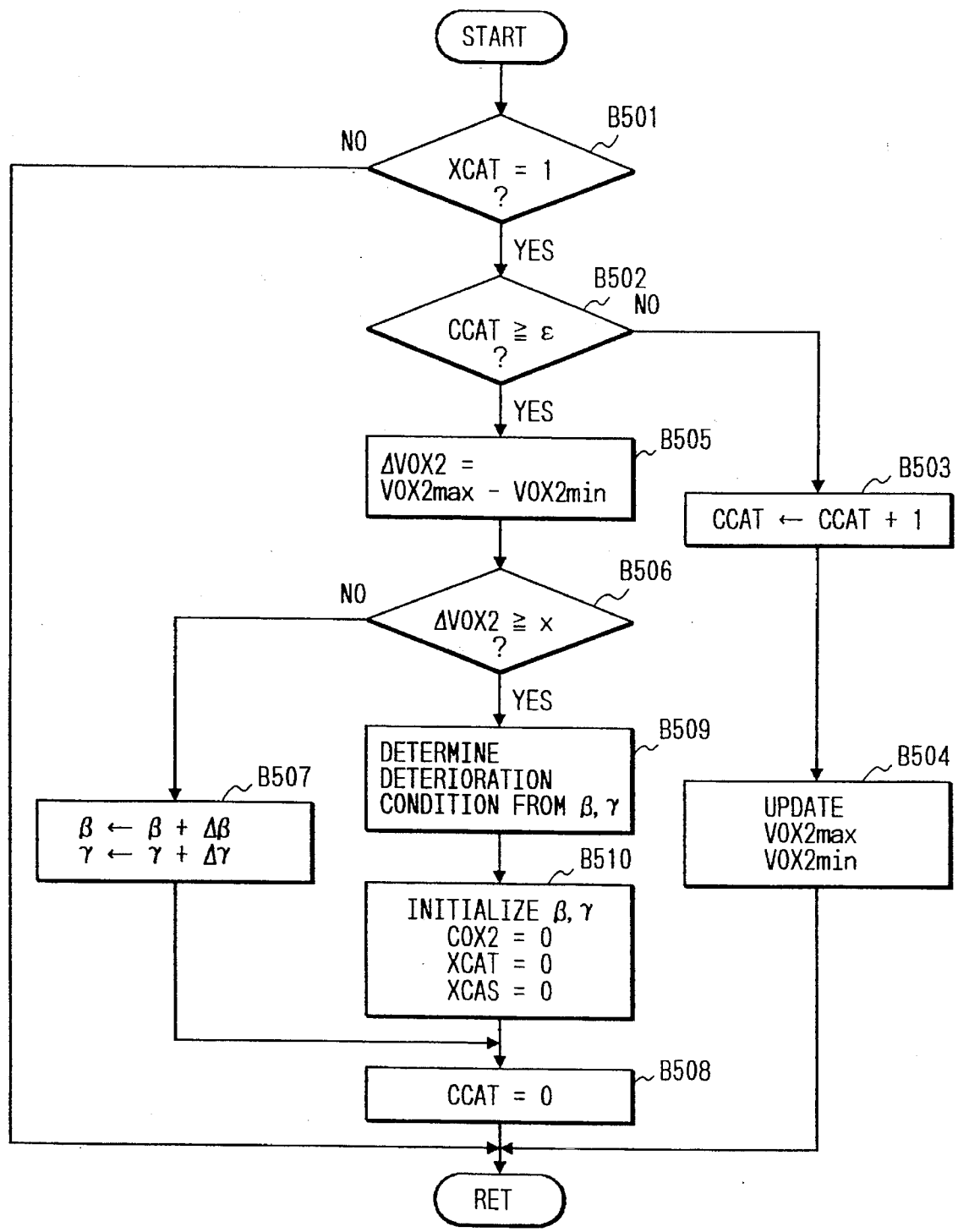
FIG. 21 is a flowchart of a deterioration degree detecting routine in the program for operating the control unit in the second embodiment.

As previously described, the block B307 in FIG. 19 includes a routine for detecting the degree of deterioration of the catalytic converter 13 (see FIG. 1). Generally, the deterioration degree detecting routine is reiterated at a given period. As shown in FIG. 21, the deterioration degree detecting routine includes a first step B501 which generally follows the step B306 of FIG. 19. The step B501 determines whether or not the control completion flag XCAT is "1". When the control completion flag XCAT is "1", the program advances from the step B501 to a step B5O2. Otherwise, the current execution cycle of the deterioration degree detecting routine ends and the program returns to the main routine.

The step B502 compares a value CCAT with a predetermined value "ε". The value CCAT indicates a continuation time counter. The predetermined value "ε" corresponds to a preset continuation time. When the continuation time counter value CCAT is equal to or greater than the predetermined value "ε", the program advances from the step B502 to a step B505. Otherwise, the program advances from the step B502 to a step B503.

The step B503 increments the continuation time counter value CCAT by "1" according to the statement "CCAT=CCAT+1". A step B504 following the step B503 samples the output voltage VOX2 of the $O_2$ sensor 27 (see FIG. 1). In addition, the step B504 determines a maximum value VOX2max and a minimum value VOX2min of the samples of the output voltage VOX2 of the $O_2$ sensor 27 (see FIG. 1) and suitably updates the maximum value VOX2max and the minimum value VOX2min. After the step B504, the current execution cycle of the deterioration degree detecting routine ends and the program returns to the main routine.

The step B505 calculates the difference ΔVOX2 between the maximum value VOX2max and the minimum value VOX2min by referring to the statement "ΔVOX2= VOX2max–VOX2min". The calculated difference ΔVOX2 indicates the magnitude of a variation in the output voltage VOX2 of the $O_2$ sensor 27 (see FIG. 1) which occurs during the last continuation time "ε". It should be noted that the magnitude of the variation in the output voltage VOX2 of the $O_2$ sensor 27 (see FIG. 1) increases as the catalytic converter 13 (see FIG. 1) is saturated.

A step B506 following the step B505 compares the difference ΔVOX2 with a predetermined reference value "x" to determine whether or not the catalytic converter 13 (see FIG. 1) is saturated. When the difference ΔVOX2 is smaller than the predetermined reference value "x", that is, when the catalytic converter 13 (see FIG. 1) is not saturated, the program advances from the step B506 to a step B507. When the difference ΔVOX2 is equal to or greater than the predetermined reference value "x", that is, when the catalytic converter 13 (see FIG. 1) is saturated, the program advances from the step B506 to a step B509.

The step B507 increments the deterioration detection corrective value "β" by a predetermined value Δβ according to the statement "β=β+Δβ". In addition, the step B507 increments the deterioration detection corrective value "γ" by a predetermined value Δγ according to the statement "γ=γ+Δγ". After the step B507, the program advances to a step B508.

The step B508 resets the continuation time counter value CCAT to "0". After the step B508, the current execution cycle of the deterioration degree detecting routine ends and the program returns to the main routine.

Figure 23:
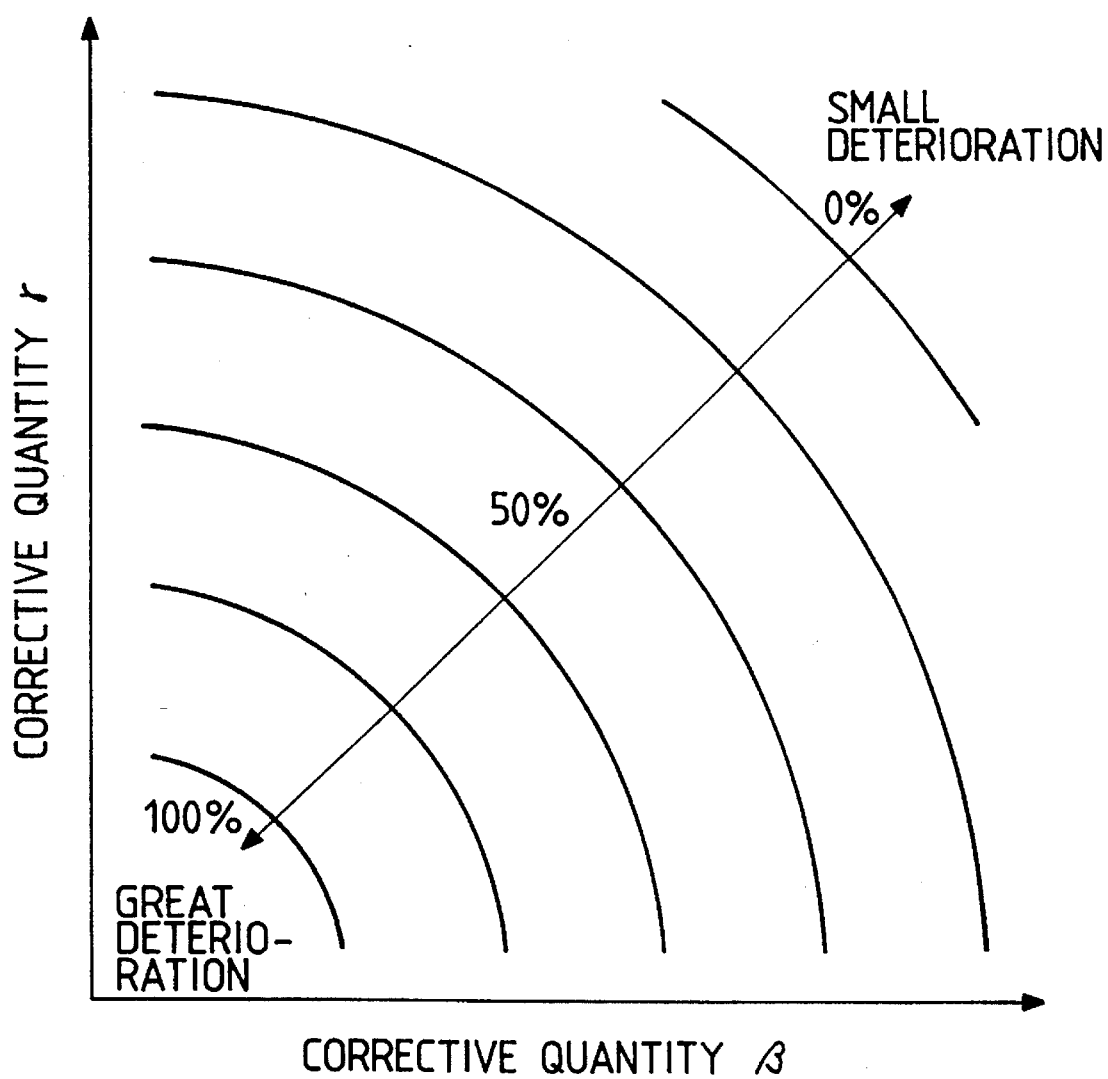
FIG. 23 is a diagram of the relation among the degree of deterioration of the catalytic converter, and deterioration detection corrective values "β" and "γ" in the second embodiment.

The step B509 determines the degree of deterioration of the catalytic converter 13 (see FIG. 1) in response to the current deterioration detection corrective values "β" and "γ" by referring to a predetermined map or table stored in the ROM 33 (see FIG. 1). This map is designed to provide a relation among the degree of deterioration of the catalytic converter 13 (see FIG. 1) and the current deterioration detection corrective values "β" and "γ" such as shown in FIG. 23. The degree of deterioration of the catalytic converter 13 (see FIG. 1) is numerically expressed in percent unit. The step B509 stores a signal representative of the determined degree of deterioration of the catalytic converter 13 (see FIG. 1) into the RAM 34 (see FIG. 1). The determined degree of deterioration of the catalytic converter 13 (see FIG. 1) is used by the steps B205 and B209 of FIG. 16 in calculating the rich skip quantity λSKR and the lean skip quantity λSKL.

The saturation of the catalytic converter 13 (see FIG. 1) which occurs at smaller deterioration detection corrective values "β" and "γ" means a greater degree of deterioration of the catalytic converter 13 (see FIG. 1). Thus, as shown in FIG. 23, the determined degree of deterioration of the catalytic converter 13 (see FIG. 1) increases as the deterioration detection corrective values "β" and "γ" which occur upon the saturation of the catalytic converter 13 (see FIG. 1) decrease.

A step B510 following the step B509 resets the deterioration detection corrective values "β" and "γ" to their initial values. In addition, the step B510 resets the waiting time counter value COX2, the control completion flag XCAT, and the deterioration detection executing flag XCAS to "0". After the step B510, the program advances to the step B508.

As previously described, the deterioration detection executing flag XCAS is set to "1" each time the distance traveled by the vehicle body increases by 2,000 km. The amplitude and period control routine in FIG. 20 and the deterioration degree detecting routine in FIG. 21 provide the following processes in response to the setting of the deterioration detection executing flag XCAS to "1". In the case where the engine 1 (see FIG. 1) remains in the given steady operating conditions and the value VOX2 of the output voltage of the $O_2$ sensor 27 (see FIG. 1) stays between the rich-side allowable limit value VRL and the lean-side allowable limit value VLL, when the preset waiting time "α" elapses, the operation of the control unit 31 (see FIG. 1) falls into a mode for detecting the degree of deterioration of the catalytic converter 13 (see FIG. 1). At a start of the deterioration degree detecting mode of operation of the control unit 31 (see FIG. 1), the step B407 in FIG. 20 correctively increases the dither amplitude λDZA and the dither period TDZA. As shown in FIG. 22, the target A/F ratio varies or vibrates at a greater amplitude and a longer period in response to the correctively-increased increased dither amplitude λDZA and dither period TDZA. The target A/F ratio continues to vary or vibrate at the greater amplitude and the longer period during the preset continuation time "ε". Immediately after the preset continuation time "ε" elapses, the step B506 in FIG. 21 determines whether or not the catalytic converter 13 (see FIG. 1) is saturated. When the catalytic converter 13 (see FIG. 1) is not saturated, the step B407 in FIG. 20 further correctively increases the dither amplitude λDZA and the dither period TDZA. Therefore, as shown in FIG. 22, the target A/F ratio varies or vibrates at a further greater amplitude and a further longer period. The target A/F ratio continues to vary or vibrate at the further greater amplitude and the further longer period during the next preset continuation time "ε". Immediately after the next preset continuation time "ε" elapses, the step B506 in FIG. 21 determines whether or not the catalytic converter 13 (see FIG. 1) is saturated. Such processes are reiterated until the step B506 in FIG. 21 detects saturation of the catalytic converter 13 (see FIG. 1). It should be noted that vibration of the arget A/F ratio at a greater amplitude and a longer period causes the catalytic converter 13 (see FIG. 1) to be more easily and surely saturated. When the step B506 in FIG. 21 detects saturation of the catalytic converter 13 (see FIG. 1), the step B509 in FIG. 21 determines the degree of deterioration of the catalytic converter 13 (see FIG. 1) in response to the current deterioration detection corrective values "β" and "γ" which are components of the current dither amplitude λDZA and the current dither period TDZA. Then, the step B510 is executed to terminate the deterioration degree detecting mode of operation of the control unit 31 (see FIG. 1) and to restart the normal dither control with the small amplitude and the short period. The detection of saturation of the catalytic converter 13 (see FIG. 1) by the step B506 in FIG. 21 is based on the fact that, as shown in FIG. 22, the difference ΔVOX2 between the maximum value VOX2max and the minimum value VOX2,min of the output voltage VOX2 of the $O_2$ sensor 27 (see FIG. 1) is equal to or greater than the predetermined reference value "x" when the catalytic converter 13 (see FIG. 1) is saturated.

During the deterioration degree detecting mode of operation of the control unit 31 (see FIG. 1), the degree of deterioration of the catalytic converter 13 (see FIG. 1) is determined and is expressed by the numerical value according to the deterioration degree detecting routine of FIG. 21. During the normal mode of operation of the control unit 31 (see FIG. 1) which follows the deterioration degree detecting mode, the rich skip quantity λSKR and the lean skip quantity λSKL are calculated from the determined degree of deterioration of the catalytic converter 13 (see FIG. 1) according to the central value setting routine of FIG. 16. In this way, the determined degree of deterioration of the catalytic converter 13 (see FIG. 1) is used in A/F control of an air-fuel mixture.

During the deterioration degree detecting mode of operation of the control unit 31 (see FIG. 1), the catalytic converter 13 (see FIG. 1) is actually saturated by correctively increasing the dither amplitude λDZA and the dither period TDZA, and the degree of deterioration of the catalytic converter 13 (see FIG. 1) is determined or detected from the dither amplitude λDZA and the dither period TDZA upon the occurrence of saturation of the catalytic converter 13 (see FIG. 1). Thus, the degree of deterioration of the catalytic converter 13 (see FIG. 1) is directly determined, and the result of the determination is reliable.

During the normal mode of operation of the control unit 31 (see FIG. 1) other than the deterioration degree detecting mode, in the central value setting routine of FIG. 16, the central value λTGC of the target A/F ratio λTG is corrected in response to not only the rich-side and lean-side integral values λIR and λIR but also the rich and lean skip quantities λSKR and λSKL so that the A/F ratio of an air-fuel mixture can be essentially maintained at the stoichiometric A/F ratio "λ=1". When the deterioration degree detecting mode of operation of the control unit 31 (see FIG. 1) starts, the actual A/F ratio of an air-fuel mixture is moved or vibrated around the stoichiometric A/F ratio "λ=1" at a greater amplitude and a longer period. Thus, the degree of deterioration of the catalytic converter 13 (see FIG. 1) can be determined without being affected by other disturbances. In addition, since the sensitivity of the $O_2$ sensor 27 (see FIG. 1) is good for an A/F ratio at and near the stoichiometric A/F ratio "λ=1", the determination of the degree of deterioration of the catalytic converter 13 (see FIG. 1) can be accurate.

As previously described, the degree of deterioration of the catalytic converter 13 (see FIG. 1) is detected each time the distance traveled by the vehicle body increases by 2,000 km. The degree of deterioration of the catalytic converter 13 (see FIG. 1) may be detected when the total time of travel of the vehicle body increases by each preset time or when the total time of operation of the engine 1 (see FIG. 1) increases by each preset time.

As previously described, during the deterioration degree detecting mode of operation of the control unit 31 (see FIG. 1), both the dither amplitude λDZA and the dither period TDZA are correctively increased. It should be noted that only one of the dither amplitude λDZA and the dither period TDZA may be correctively increased.

What is claimed is:

1. An apparatus for detecting a saturation gas amount absorbed by a catalytic converter disposed in an exhaust system of an engine, comprising:

air-to-fuel ratio detecting means disposed in a region of the engine exhaust system downstream of the catalytic converter for monitoring exhaust gas, which has passed through the catalytic converter, to detect an air-to-fuel ratio of an air-fuel mixture causing the exhaust gas;

air-to-fuel ratio changing means for, in cases where the air-to-fuel ratio detected by the air-to-fuel ratio detecting means remains in a given range around a stoichiometric ratio during at least a predetermined time, changing an air-to-fuel ratio of an air-fuel mixture fed to the engine by a correction quantity in a given direction, and maintaining said changing-the air-to-fuel ratio during a correction time;

change increasing means for increasing at least one of the correction quantity and the correction time by the air-to-fuel ratio changing means to execute an air-to-fuel ratio changing process again in cases where the air-to-fuel ratio detected by the air-to-fuel ratio detecting means does not vary even when the air-to-fuel ratio changing means executes said changing air-to-fuel ratio; and saturation gas amount calculating means for calculating a saturation gas amount absorbed by the catalytic converter on the basis of the correction quantity and the correction time in cases where the air-to-fuel ratio detected by the air-to-fuel ratio detecting means varies when the air-to-fuel ratio changing means executes said changing the air-to-fuel ratio.

2. The apparatus of claim 1 wherein the air-to-fuel ratio changing means is operative to change the air-to-fuel ratio in a direction opposite to the given direction after said changing the air-to-fuel ratio.

3. An apparatus for detecting a saturation gas amount absorbed by a catalytic converter disposed in an exhaust system of an engine, comprising:

means for feeding an air-fuel mixture to the engine;

means for changing an air-to-fuel ratio of the air-fuel mixture from a stoichiometric air-to-fuel ratio to saturate the catalytic converter;

means for detecting whether or not the catalytic converter is saturated by said changing the air-to-fuel ratio by the changing means; and means for, when the detecting means detects that the catalytic converter is saturated, determining a saturation gas amount absorbed by the catalytic converter in accordance with a degree and a duration of said changing the air-to-fuel ratio by the changing means.

4. A method of detecting a saturation gas amount absorbed by a catalytic converter disposed in an exhaust system of an engine, comprising the steps of:

feeding an air-fuel mixture to the engine;

changing an air-to-fuel ratio of the air-fuel mixture from a stoichiometric air-to-fuel ratio to saturate the catalytic converter;

detecting whether or not the catalytic converter is saturated by said changing the air-to-fuel ratio; and when the catalytic converter is detected to be saturated, determining a saturation gas amount absorbed by the catalytic converter in accordance with a degree and a duration of said changing the air-to-fuel ratio.

5. An apparatus for detecting a condition of deterioration of a catalytic converter disposed in an exhaust passage of an internal combustion engine, comprising:

upstream air-to-fuel ratio detecting means provided in a region of the exhaust passage upstream of the catalytic converter for detecting an air-to-fuel ratio of an air-fuel mixture causing exhaust gas flowing into the catalytic converter;

downstream air-to-fuel ratio detecting means provided in a region of the exhaust passage downstream of the catalytic converter for detecting an air-to-fuel ratio of an air-fuel mixture causing exhaust gas flowing from the catalytic converter;

air-to-fuel control means for controlling a rate of fuel injection into the engine in response to a result of said detecting by the upstream air-to-fuel ratio detecting means, and for varying the air-to-fuel ratio of the air-fuel mixture causing the exhaust gas flowing into the catalytic converter around a predetermined air-to-fuel ratio at an amplitude and a period;

increasing control means for correcting and increasing at least one of the amplitude and the period of said varying by the air-to-fuel ratio control means during a predetermined time; and deterioration condition determining means for increasing a degree of said increasing by said increasing control means in cases where the air-to-fuel ratio detected by the downstream air-to-fuel ratio detecting means does not vary although at least one of the amplitude and the period is corrected and increased by the increasing control means, and for, when the air-to-fuel ratio detected by the downstream air-to-fuel ratio detecting means varies, determining a condition of deterioration of the catalytic converter in response to the amplitude and the period which occur as a result of said variation.

6. The apparatus of claim 5, wherein the air-to-fuel ratio control means comprises target air-to-fuel ratio setting means for setting a target air-to-fuel ratio, and feedback means for feedback-controlling the fuel injection rate in response to the result of said detecting by the upstream air-to-fuel ratio detecting means so that the result of said detecting by the upstream air-to-fuel ratio detecting means can be essentially maintained at the target air-to-fuel ratio, the target air-to-fuel ratio varying around the predetermined air-to-fuel ratio at the amplitude and the period.

7. The apparatus of claim 6, wherein the air-to-fuel ratio control means comprises air-to-fuel ratio correcting means for correcting the predetermined air-to-fuel ratio in response to a result of said detecting by the downstream air-to-fuel ratio detecting means.

8. The apparatus of claim 1, wherein the air-to-fuel ratio correcting means comprises skip means for, when the result of said detecting by the downstream air-to-fuel ratio detecting means changes between a rich side and a lean side with respect to a predetermined reference value, changing stepwise the predetermined air-to-fuel ratio in a direction opposite to a direction of said change in the result of said detecting by the downstream air-to-fuel ratio detecting means, and skip quantity setting means for varying a quantity of said stepwise changing by the skip control means in response to the condition of deterioration of the catalytic converter which is determined by the deterioration condition determining means.

9. The apparatus of claim 6, wherein the increasing control means comprises means for correcting and increasing at least one of an amplitude and a period of the target air-to-fuel ratio set by the target air-to-fuel ratio setting means.

10. The apparatus of claim 7, wherein the increasing control means comprises means for correcting and increasing at least one of an amplitude and a period of the target air-to-fuel ratio set by the target air-to-fuel ratio setting means.

11. The apparatus of claim 5, wherein the predetermined time used by the increasing control means is set when a total time of operation of the engine increases by each predetermined interval.

12. The apparatus of claim 11, wherein the engine is mounted on a vehicle, and the predetermined time used by the increasing control means is set as a distance traveled by the vehicle.

13. The apparatus of claim 11, further comprising means for canceling said correcting and increasing by the increasing control means after the condition of deterioration of the catalytic converter is determined by the deterioration condition determining means.

14. The apparatus of claim 5, wherein the increasing control means is operative for accumulatively increasing at least one of the amplitude and the period every given interval until the air-to-fuel ratio detected by the downstream air-to-fuel ratio detecting means varies during determination of the condition of deterioration of the catalytic converter by the deterioration condition determining means.

15. The apparatus of claim 14, wherein the increasing control means comprises means for executing said correcting and increasing of at least one of the amplitude and the period when the air-to-fuel ratio detected by the downstream air-to-fuel ratio detecting means is in a predetermined allowable range.

16. A method of detecting a condition of deterioration of a catalytic converter disposed in an exhaust passage of an internal combustion engine, comprising the steps of:

detecting an upstream air-to-fuel ratio of an air-fuel mixture causing exhaust gas flowing into the catalytic converter;

detecting a downstream air-to-fuel ratio of an air-fuel mixture causing exhaust gas flowing from the catalytic converter;

controlling a rate of fuel injection into the engine in response to a result of said detected upstream air-to-fuel ratio, and varying the air-to-fuel ratio of the air-fuel mixture causing the exhaust gas flowing into the catalytic converter around a predetermined air-to-fuel ratio at an amplitude and a period;

correcting and increasing at least one of the amplitude and the period of said varying of the air-to-fuel ratio; and increasing a degree of said increasing of at least one of the amplitude and the period in cases where the detected downstream air-to-fuel ratio does not vary although at least one of the amplitude and the period is corrected and increased, and when the detected downstream air-to-fuel ratio varies, determining a condition of deterioration of the catalytic converter in response to the amplitude and the period which occur as result of said variation.

* * * * *